US012574509B2

(12) United States Patent
Li et al.

(10) Patent No.: US 12,574,509 B2
(45) Date of Patent: *Mar. 10, 2026

(54) METHOD AND APPARATUS FOR ENCODING/DECODING VIDEO AND METHOD FOR TRANSMITTING BITSTREAM

(71) Applicant: Nokia Technologies Oy, Espoo (FI)

(72) Inventors: Ling Li, Seoul (KR); Jin Heo, Seoul (KR)

(73) Assignee: Nokia Technologies Oy, Espoo (FI)

( * ) Notice: Subject to any disclaimer, the term of this patent is extended or adjusted under 35 U.S.C. 154(b) by 0 days.

This patent is subject to a terminal disclaimer.

(21) Appl. No.: 18/798,302

(22) Filed: Aug. 8, 2024

(65) Prior Publication Data

US 2024/0406388 A1 Dec. 5, 2024

Related U.S. Application Data

(63) Continuation of application No. 17/438,347, filed as application No. PCT/KR2020/003478 on Mar. 12, 2020, now Pat. No. 12,088,800.

(60) Provisional application No. 62/817,542, filed on Mar. 12, 2019.

(51) Int. Cl.
*H04N 19/11* (2014.01)
*H04N 19/117* (2014.01)
*H04N 19/176* (2014.01)

(52) U.S. Cl.
CPC ........... *H04N 19/11* (2014.11); *H04N 19/117* (2014.11); *H04N 19/176* (2014.11)

(58) Field of Classification Search
CPC .... H04N 19/11; H04N 19/117; H04N 19/593; H04N 19/70; H04N 19/105; H04N 19/59; H04N 19/82; H04N 19/132
See application file for complete search history.

(56) References Cited

U.S. PATENT DOCUMENTS

| | | | | |
|---|---|---|---|---|
| 11,470,306 B2 * | 10/2022 | Kim | ..................... | H04N 19/157 |
| 2021/0021818 A1 * | 1/2021 | Lee | ..................... | H04N 19/119 |
| 2021/0105468 A1 * | 4/2021 | Ikonin | ..................... | H04N 19/70 |
| 2021/0377519 A1 * | 12/2021 | Kim | ..................... | H04N 19/176 |

* cited by examiner

*Primary Examiner* — Boubacar Abdou Tchoussou
(74) *Attorney, Agent, or Firm* — McCarter & English LLP

(57) ABSTRACT

An image decoding method is disclosed. The image decoding method includes obtaining intra prediction mode information of a current block from a bitstream, determining an intra prediction mode of the current block based on the intra prediction mode information and an intra prediction mode of a neighboring block located around the current block, deriving a value of a first filter flag for use of filtering of an intra prediction reference sample of the current block based on coding parameters for the current block, selecting an interpolation filter to be used for intra prediction of the current block based on the first filter flag, and generating an intra prediction block of the current block using the selected interpolation filter.

12 Claims, 23 Drawing Sheets

FIG. 1

| predModeIntra | -14 | -13 | -12 | -11 | -10 | -9 | -8 | -7 | -6 | -5 | -4 | -3 | -2 | -1 | 2 | 3 | 4 |
|---|---|---|---|---|---|---|---|---|---|---|---|---|---|---|---|---|---|
| intraPredAngle | 512 | 341 | 256 | 171 | 128 | 102 | 86 | 73 | 64 | 57 | 51 | 45 | 39 | 35 | 32 | 29 | 26 |
| predModeIntra | 5 | 6 | 7 | 8 | 9 | 10 | 11 | 12 | 13 | 14 | 15 | 16 | 17 | 18 | 19 | 20 | 21 |
| intraPredAngle | 23 | 20 | 18 | 16 | 14 | 12 | 10 | 8 | 6 | 4 | 3 | 2 | 1 | 0 | -1 | -2 | -3 |
| predModeIntra | 22 | 23 | 24 | 25 | 26 | 27 | 28 | 29 | 30 | 31 | 32 | 33 | 34 | 35 | 36 | 37 | 38 |
| intraPredAngle | -4 | -6 | -8 | -10 | -12 | -14 | -16 | -18 | -20 | -23 | -26 | -29 | -32 | -29 | -26 | -23 | -20 |
| predModeIntra | 39 | 40 | 41 | 42 | 43 | 44 | 45 | 46 | 47 | 48 | 49 | 50 | 51 | 52 | 53 | 54 | 55 |
| intraPredAngle | -18 | -16 | -14 | -12 | -10 | -8 | -6 | -4 | -3 | -2 | -1 | 0 | 1 | 2 | 3 | 4 | 6 |
| predModeIntra | 56 | 57 | 58 | 59 | 60 | 61 | 62 | 63 | 64 | 65 | 66 | 67 | 68 | 69 | 70 | 71 | 72 |
| intraPredAngle | 8 | 10 | 12 | 14 | 16 | 18 | 20 | 23 | 26 | 29 | 32 | 35 | 39 | 45 | 51 | 57 | 64 |
| predModeIntra | 73 | 74 | 75 | 76 | 77 | 78 | 79 | 80 | | | | | | | | | |
| intraPredAngle | 73 | 86 | 102 | 128 | 171 | 256 | 341 | 512 | | | | | | | | | |

FIG. 17

| Fractional sample position p | fC interpolation filter coefficients | | | | fG interpolation filter coefficients | | | |
|---|---|---|---|---|---|---|---|---|
| | fc[ p ][ 0 ] | fc[ p ][ 1 ] | fc[ p ][ 2 ] | fc[ p ][ 3 ] | fG[ p ][ 0 ] | fG[ p ][ 1 ] | fG[ p ][ 2 ] | fG[ p ][ 3 ] |
| 0 | 0 | 64 | 0 | 0 | 16 | 32 | 16 | 0 |
| 1 | ‑1 | 63 | 2 | 0 | 15 | 29 | 17 | 3 |
| 2 | ‑2 | 62 | 4 | 0 | 15 | 29 | 17 | 3 |
| 3 | ‑2 | 60 | 7 | ‑1 | 14 | 29 | 18 | 3 |
| 4 | ‑2 | 58 | 10 | ‑2 | 13 | 29 | 18 | 4 |
| 5 | ‑3 | 57 | 12 | ‑2 | 13 | 28 | 19 | 4 |
| 6 | ‑4 | 56 | 14 | ‑2 | 13 | 28 | 19 | 4 |
| 7 | ‑4 | 55 | 15 | ‑2 | 12 | 28 | 20 | 4 |
| 8 | ‑4 | 54 | 16 | ‑2 | 11 | 28 | 20 | 5 |
| 9 | ‑5 | 53 | 18 | ‑2 | 11 | 27 | 21 | 5 |
| 10 | ‑6 | 52 | 20 | ‑2 | 10 | 27 | 22 | 5 |
| 11 | ‑6 | 49 | 24 | ‑3 | 9 | 27 | 22 | 6 |
| 12 | ‑6 | 46 | 28 | ‑4 | 9 | 26 | 23 | 6 |
| 13 | ‑5 | 44 | 29 | ‑4 | 9 | 26 | 23 | 6 |
| 14 | ‑4 | 42 | 30 | ‑4 | 8 | 25 | 24 | 7 |
| 15 | ‑4 | 39 | 33 | ‑4 | 8 | 25 | 24 | 7 |
| 16 | ‑4 | 36 | 36 | ‑4 | 8 | 24 | 24 | 8 |
| 17 | ‑4 | 33 | 39 | ‑4 | 7 | 24 | 25 | 8 |
| 18 | ‑4 | 30 | 42 | ‑4 | 7 | 24 | 25 | 8 |
| 19 | ‑4 | 29 | 44 | ‑5 | 6 | 23 | 26 | 9 |
| 20 | ‑4 | 28 | 46 | ‑6 | 6 | 23 | 26 | 9 |
| 21 | ‑3 | 24 | 49 | ‑6 | 6 | 22 | 27 | 9 |
| 22 | ‑2 | 20 | 52 | ‑6 | 5 | 22 | 27 | 10 |
| 23 | ‑2 | 18 | 53 | ‑5 | 5 | 21 | 27 | 11 |
| 24 | ‑2 | 16 | 54 | ‑4 | 5 | 20 | 28 | 11 |
| 25 | ‑2 | 15 | 55 | ‑4 | 4 | 20 | 28 | 12 |
| 26 | ‑2 | 14 | 56 | ‑4 | 4 | 19 | 28 | 13 |
| 27 | ‑2 | 12 | 57 | ‑3 | 4 | 19 | 28 | 13 |
| 28 | ‑2 | 10 | 58 | ‑2 | 4 | 18 | 29 | 13 |
| 29 | ‑1 | 7 | 60 | ‑2 | 3 | 18 | 29 | 14 |
| 30 | 0 | 4 | 62 | ‑2 | 3 | 17 | 29 | 15 |
| 31 | 0 | 2 | 63 | ‑1 | 3 | 17 | 29 | 15 |

FIG. 33

METHOD AND APPARATUS FOR ENCODING/DECODING VIDEO AND METHOD FOR TRANSMITTING BITSTREAM

CROSS-REFERENCE TO RELATED APPLICATIONS

This application is a continuation of U.S. application Ser. No. 17/438,347, filed on Sep. 10, 2021, which is a National Stage application under 35 U.S.C. § 371 of International Application No. PCT/KR2020/003478, filed on Mar. 12, 2020, which claims the benefit of U.S. Provisional Application No. 62/817,542, filed on Mar. 12, 2019. The disclosures of the prior applications are incorporated by reference in their entirety.

TECHNICAL FIELD

The present disclosure relates to an image encoding/decoding method and apparatus, and a method of transmitting a bitstream and, more particularly, to a method and apparatus for encoding/decoding an image by performing intra prediction using reference sample filtering, and a method of transmitting a bitstream generated thereby.

BACKGROUND ART

Recently, demand for high-resolution and high-quality images such as high definition (HD) images and ultra high definition (UHD) images is increasing in various fields. As resolution and quality of image data are improved, the amount of transmitted information or bits relatively increases as compared to existing image data. An increase in the amount of transmitted information or bits causes an increase in transmission cost and storage cost.

Accordingly, there is a need for high-efficient image compression technology for effectively transmitting, storing and reproducing information on high-resolution and high-quality images.

DISCLOSURE

Technical Problem

An object of the present disclosure is to provide an image encoding/decoding method and apparatus with improved encoding/decoding efficiency.

In addition, an object of the present disclosure is to provide a method and apparatus for encoding/decoding an image by selecting a filter applied when a prediction sample is derived according to whether filtering of a sample referenced during intra prediction is used.

Another object of the present disclosure is to provide a method of transmitting a bitstream generated by an image encoding method or apparatus according to the present disclosure.

Another object of the present disclosure is to provide a recording medium storing a bitstream generated by an image encoding method or apparatus according to the present disclosure.

Another object of the present disclosure is to provide a recording medium storing a bitstream received, decoded and used to reconstruct an image by an image decoding apparatus according to the present disclosure.

The technical problems solved by the present disclosure are not limited to the above technical problems and other technical problems which are not described herein will become apparent to those skilled in the art from the following description.

Technical Solution

An image decoding method performed by an image decoding apparatus according to an embodiment for solving the above problems includes obtaining intra prediction mode information of a current block from a bitstream, determining an intra prediction mode of the current block based on the intra prediction mode information and an intra prediction mode of a neighboring block located around the current block, deriving a value of a first filter flag for use of filtering of an intra prediction reference sample of the current block based on coding parameters for the current block, applying smoothing filtering to the intra prediction reference sample of the current block when the value of the first filter flag indicates use of filtering of the intra prediction reference sample of the current block, selecting an interpolation filter to be used for intra prediction of the current block based on the first filter flag, and generating an intra prediction block of the current block using the selected interpolation filter.

When the first filter flag indicates that the intra prediction reference sample of the current block has been subjected to smoothing filtering, a smoothing filter may be selected and applied to the reference sample the an interpolation filter to be used for intra prediction of the current block, thereby deriving a prediction sample of the current block.

When the first filter flag indicates that the intra prediction reference sample of the current block has not been subjected to smoothing filtering, a sharpening filter may be selected and applied to the reference sample as the interpolation filter to be used for intra prediction of the current block, thereby deriving a prediction sample of the current block.

To this end, an image decoding method performed by an image decoding apparatus according to an embodiment for solving the above problems includes obtaining intra prediction mode information of a current block from a bitstream, determining an intra prediction mode of the current block based on the intra prediction mode information and an intra prediction mode of a neighboring block located around the current block, deriving a value of a first filter flag for use of filtering of an intra prediction reference sample of the current block based on coding parameters for the current block, selecting an interpolation filter to be used for intra prediction of the current block based on the first filter flag, and generating an intra prediction block of the current block using the selected interpolation filter.

Applying smoothing filtering to the intra prediction reference sample of the current block when the value of the first filter flag indicates use of filtering of the intra prediction reference sample of the current block may be further included.

The coding parameters may include at least one of a multi-reference line index of the current block, a size of the current block, a color component of the current block, whether to apply intra sub-partitions (ISP) to the current block or the intra prediction mode of the current block.

Filtering of the intra prediction reference sample may not be used, when the value of the first filter flag is a first value, filtering of the intra prediction reference sample may be used, when the value of the first filter flag is a second value, the interpolation filter to be used for intra prediction of the current block may be determined as a filter having a sharpening characteristic, when the value of the first filter flag is a first value, and the interpolation filter to be used for intra prediction of the current block may be determined as a filter having a smoothing characteristic, when the value of the first filter flag is a second value.

The selecting the interpolation filter to be used for intra prediction of the current block based on the first filter flag may include deriving a value of a second filter flag for the interpolation filter to be used for intra prediction of the current block based on the first filter flag, and selecting an interpolation filter based on the second filter flag.

The value of the second filter flag may be derived as a first value, when a condition for at least one of the coding parameters is satisfied.

The value of the second filter flag may be derived as a first value, when intra sub-partitions (ISP) is applied to the current block.

The value of the second filter flag may be derived as a first value, when intra sub-partitions (ISP) is applied to the current block, the current block is a luma block, the intra prediction mode of the current block is equal to or greater than a predetermined mode and a width of the current block is equal to or greater than a predetermined size. In addition, the predetermined mode may be a top-left diagonal mode and the predetermined size may be 8.

The value of the second filter flag may be derived as a first value, when intra sub-partitions (ISP) is applied to the current block, the current block is a luma block, the intra prediction mode of the current block is equal to or less than a predetermined mode and a width of the current block is equal to or greater than a predetermined size. The predetermined mode may be a top-left diagonal mode and the predetermined size may be 8.

Filtering of the intra prediction reference sample may not be used, when the value of the first filter flag is a first value, filtering of the intra prediction reference sample may be used, when the value of the first filter flag is a second value, and the value of the second filter flag may be derived as 0 when the value of the first filter flag is 1

The interpolation filter may be a filter having a sharpening characteristic, when the value of the second filter flag is a first value, the interpolation filter may be a filter having a smoothing characteristic, when the value of the second filter flag is a second value, and the value of the second filter flag may be derived as a first value, when the value of the first filter flag is a second value.

An image decoding apparatus according to an embodiment for solving the above problems includes a memory and at least one processor. The at least one processor may obtain intra prediction mode information of a current block from a bitstream, determine an intra prediction mode of the current block based on the intra prediction mode information and an intra prediction mode of a neighboring block located around the current block, derive a value of a first filter flag for use of filtering of an intra prediction reference sample of the current block based on coding parameters for the current block, select an interpolation filter to be used for intra prediction of the current block based on the first filter flag, and generate an intra prediction block of the current block using the selected interpolation filter.

An image encoding method performed by an image encoding apparatus according to an embodiment for solving the above problems includes selecting an intra prediction mode of a current block, deriving a value of a first filter flag for use of filtering of an intra prediction reference sample of the current block based on coding parameters for the current block, selecting an interpolation filter to be used for intra prediction of the current block based on the first filter flag, generating an intra prediction block of the current block using the selected interpolation filter, and encoding the intra prediction mode of the current block based on an intra prediction mode of a neighboring block located around the current block.

An image encoding apparatus according to an embodiment for solving the above problems may transmit a bitstream generated as described above.

Advantageous Effects

According to the present disclosure, it is possible to provide an image encoding/decoding method and apparatus with improved encoding/decoding efficiency.

In addition, according to the present disclosure, it is possible to provide a method and apparatus for encoding/decoding an image by selecting a filter applied when a prediction sample is derived according to whether filtering of a sample referenced during intra prediction is used.

Also, according to the present disclosure, it is possible to provide a method of transmitting a bitstream generated by an image encoding method or apparatus according to the present disclosure.

Also, according to the present disclosure, it is possible to provide a recording medium storing a bitstream generated by an image encoding method or apparatus according to the present disclosure.

Also, according to the present disclosure, it is possible to provide a recording medium storing a bitstream received, decoded and used to reconstruct an image by an image decoding apparatus according to the present disclosure.

It will be appreciated by persons skilled in the art that that the effects that can be achieved through the present disclosure are not limited to what has been particularly described hereinabove and other advantages of the present disclosure will be more clearly understood from the detailed description.

DESCRIPTION OF DRAWINGS

FIG. 1 is a view schematically illustrating a video coding system according to an embodiment.

FIG. 7 is a flowchart illustrating a reference sample construction step according to an embodiment.

FIG. 17 is a table illustrating coefficients of a cubic filter (fC) and a Gaussian filter (fG) as an interpolation filter used for intra prediction according to an embodiment.

FIGS. 18 to 20 are flowcharts illustrating a method of deriving a reference sample array ref[x] by a decoding apparatus according to an embodiment.

FIG. 33 is a view illustrating another embodiment of performing intra prediction using reference sample filtering by a decoding apparatus according to an embodiment.

MODE FOR INVENTION

Figure 2:
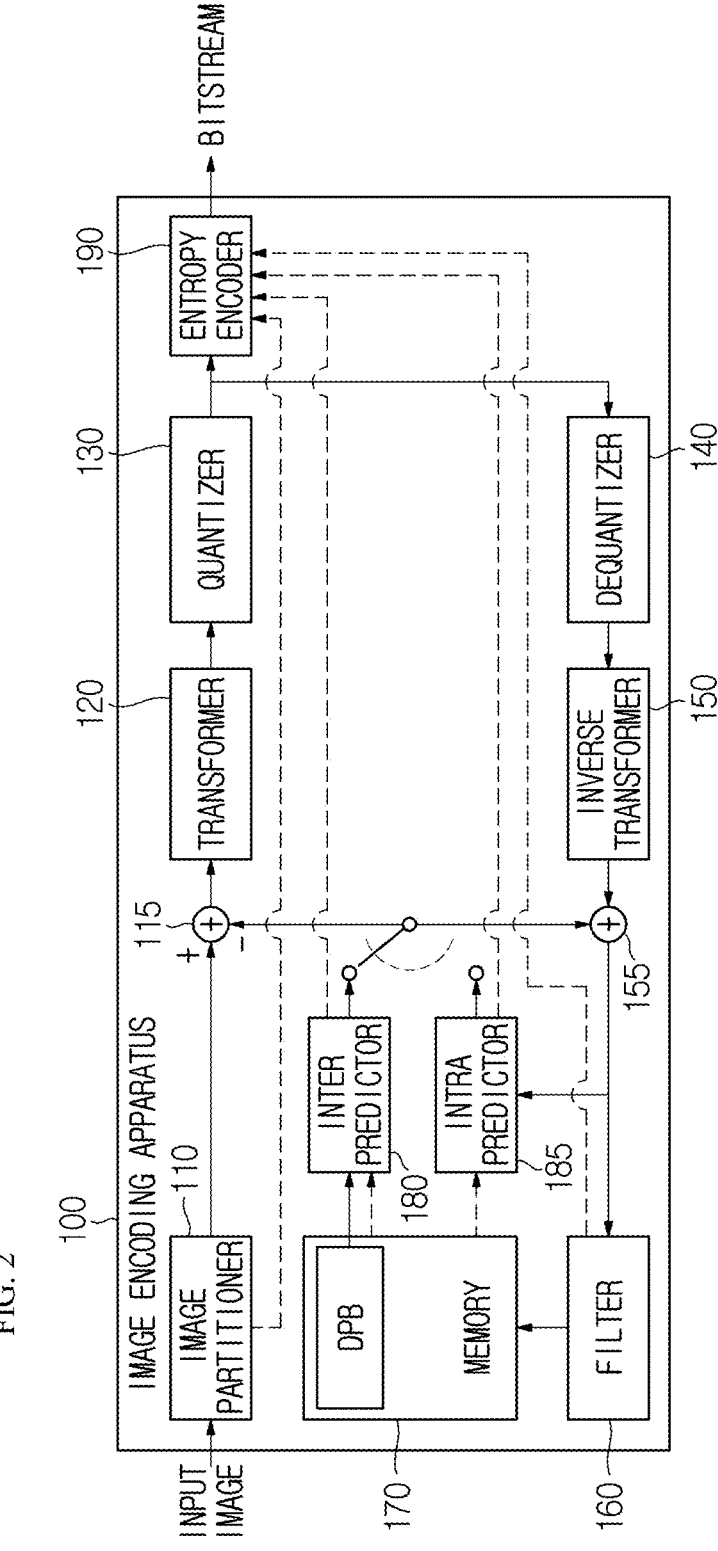
FIG. 2 is a view schematically illustrating an image encoding apparatus according to an embodiment.

Hereinafter, the embodiments of the present disclosure will be described in detail with reference to the accompanying drawings so as to be easily implemented by those skilled in the art. However, the present disclosure may be implemented in various different forms, and is not limited to the embodiments described herein.

In describing the present disclosure, if it is determined that the detailed description of a related known function or construction renders the scope of the present disclosure unnecessarily ambiguous, the detailed description thereof will be omitted. In the drawings, parts not related to the description of the present disclosure are omitted, and similar reference numerals are attached to similar parts.

In the present disclosure, when a component is "connected", "coupled" or "linked" to another component, it may include not only a direct connection relationship but also an indirect connection relationship in which an intervening component is present. In addition, when a component "includes" or "has" other components, it means that other components may be further included, rather than excluding other components unless otherwise stated.

In the present disclosure, the terms first, second, etc. may be used only for the purpose of distinguishing one component from other components, and do not limit the order or importance of the components unless otherwise stated. Accordingly, within the scope of the present disclosure, a first component in one embodiment may be referred to as a second component in another embodiment, and similarly, a second component in one embodiment may be referred to as a first component in another embodiment.

In the present disclosure, components that are distinguished from each other are intended to clearly describe each feature, and do not mean that the components are necessarily separated. That is, a plurality of components may be integrated and implemented in one hardware or software unit, or one component may be distributed and implemented in a plurality of hardware or software units. Therefore, even if not stated otherwise, such embodiments in which the components are integrated or the component is distributed are also included in the scope of the present disclosure.

In the present disclosure, the components described in various embodiments do not necessarily mean essential components, and some components may be optional components. Accordingly, an embodiment consisting of a subset of components described in an embodiment is also included in the scope of the present disclosure. In addition, embodiments including other components in addition to components described in the various embodiments are included in the scope of the present disclosure.

The present disclosure relates to encoding and decoding of an image, and terms used in the present disclosure may have a general meaning commonly used in the technical field, to which the present disclosure belongs, unless newly defined in the present disclosure.

Hereinafter, the present disclosure discloses a video/image coding technique. the encoding/decoding method disclosed in the present disclosure and an embodiment may be applied to a method disclosed in a versatile video coding (VVC) standard or a next-generation video/image coding standard.

The present disclosure provides various embodiments related to video/image coding, and unless otherwise stated, the embodiments may be performed in combination with each other.

In the present disclosure, a "picture" generally refers to a unit representing one image in a specific time period, and a slice/tile is a coding unit constituting a part of a picture, and one picture may be composed of one or more slices/tiles. In addition, a slice/tile may include one or more coding tree units (CTUs).

In the present disclosure, a "pixel" or a "pel" may mean a smallest unit constituting one picture (or image). In addition, "sample" may be used as a term corresponding to a pixel. A sample may generally represent a pixel or a value of a pixel, and may represent only a pixel/pixel value of a luma component or only a pixel/pixel value of a chroma component.

In the present disclosure, a "unit" may represent a basic unit of image processing. The unit may include at least one of a specific region of the picture and information related to the region. The unit may be used interchangeably with terms such as "sample array", "block" or "area" in some cases. In a general case, an M×N block may include samples (or sample arrays) or a set (or array) of transform coefficients of M columns and N rows.

In the present disclosure, "current block" may mean one of "current coding block", "current coding unit", "coding target block", "decoding target block" or "processing target block". When prediction is performed, "current block" may mean "current prediction block" or "prediction target block". When transform (inverse transform)/quantization (dequantization) is performed, "current block" may mean "current transform block" or "transform target block". When filtering is performed, "current block" may mean "filtering target block".

In the present disclosure, A slash (/) or comma may be interpreted as "and/or". For example, "A/B" and "A, B" may be interpreted as "A and/or B". Also, "A/B/C" and "A, B, and C" may mean "at least one of A, B and/or C".

In the present disclosure, "or" may be construed as "and/or". For example, "A or B" may mean 1) only "A", 2) only "B", or 3) "A and B". Alternatively, in the present disclosure, "or" may mean "additionally or alternatively".

Overview of Video Coding System

Figure 1:
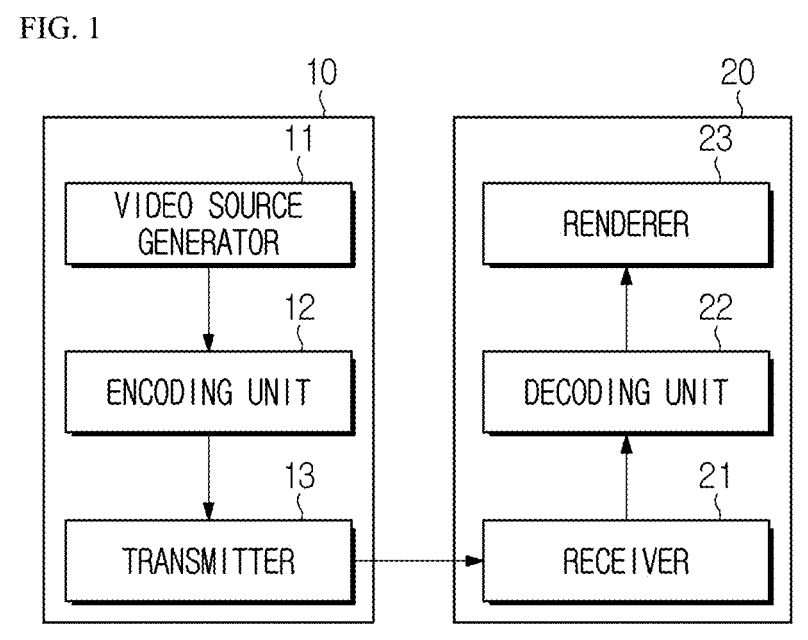

FIG. 1 is a view schematically illustrating a video coding system according to an embodiment. The video coding system according to an embodiment may include a encoding apparatus 10 and a decoding apparatus 20. The encoding apparatus 10 may deliver encoded video and/or image information or data to the decoding apparatus 20 in the form of a file or streaming via a digital storage medium or network.

The encoding apparatus 10 according to an embodiment may include a video source generator 11, an encoding unit 12 and a transmitter 13. The decoding apparatus 20 according to an embodiment may include a receiver 21, a decoding unit 22 and a renderer 23. The encoding unit 12 may be called a video/image encoding unit, and the decoding unit 22 may be called a video/image decoding unit. The transmitter 13 may be included in the encoding unit 12. The receiver 21 may be included in the decoding unit 22. The renderer 23 may include a display and the display may be configured as a separate device or an external component.

The video source generator 11 may acquire a video/image through a process of capturing, synthesizing or generating the video/image. The video source generator 11 may include a video/image capture device and/or a video/image generating device. The video/image capture device may include, for example, one or more cameras, video/image archives including previously captured video/images, and the like. The video/image generating device may include, for example, computers, tablets and smartphones, and may (electronically) generate video/images. For example, a virtual video/image may be generated through a computer or the like. In this case, the video/image capturing process may be replaced by a process of generating related.

The encoding unit 12 may encode an input video/image. The encoding unit 12 may perform a series of procedures such as prediction, transform, and quantization for compression and coding efficiency. The encoding unit 12 may output encoded data (encoded video/image information) in the form of a bitstream.

The transmitter 13 may transmit the encoded video/image information or data output in the form of a bitstream to the receiver 21 of the decoding apparatus 20 through a digital storage medium or a network in the form of a file or streaming. The digital storage medium may include various storage mediums such as USB, SD, CD, DVD, Blu-ray, HDD, SSD, and the like. The transmitter 13 may include an element for generating a media file through a predetermined file format and may include an element for transmission through a broadcast/communication network. The receiver 21 may extract/receive the bitstream from the storage medium or network and transmit the bitstream to the decoding unit 22.

The decoding unit 22 may decode the video/image by performing a series of procedures such as dequantization, inverse transform, and prediction corresponding to the operation of the encoding unit 12.

The renderer 23 may render the decoded video/image. The rendered video/image may be displayed through the display.

Overview of Image Encoding Apparatus

FIG. 2 is a view schematically illustrating an image encoding apparatus according to an embodiment. As shown in FIG. 2, the image encoding apparatus 100 may include an image partitioner 110, a subtractor 115, a transformer 120, a quantizer 130, a dequantizer 140, an inverse transformer 150, an adder 155, a filter 160, a memory 170, an inter predictor 180, an intra predictor 185 and an entropy encoder 190. The inter predictor 180 and the intra predictor 185 may be collectively referred to as a "predictor". The transformer 120, the quantizer 130, the dequantizer 140 and the inverse transformer 150 may be included in a residual processor. The residual processor may further include the subtractor 115.

All or at least some of the plurality of components configuring the image encoding apparatus 100 may be configured by one hardware component (e.g., an encoder or a processor) in some embodiments. In addition, the memory 170 may include a decoded picture buffer (DPB) and may be configured by a digital storage medium.

The image partitioner 110 may partition an input image (or a picture or a frame) input to the image encoding apparatus 100 into one or more processing units. For example, the processing unit may be called a coding unit (CU). The coding unit may be acquired by recursively partitioning a coding tree unit (CTU) or a largest coding unit (LCU) according to a quad-tree binary-tree ternary-tree (QT/BT/TT) structure. For example, one coding unit may be partitioned into a plurality of coding units of a deeper depth based on a quad tree structure, a binary tree structure, and/or a ternary structure. For partitioning of the coding unit, a quad tree structure may be applied first and the binary tree structure and/or ternary structure may be applied later. The coding procedure according to the present disclosure may be performed based on the final coding unit that is no longer partitioned. The largest coding unit may be used as the final coding unit or the coding unit of deeper depth acquired by partitioning the largest coding unit may be used as the final coding unit. Here, the coding procedure may include a procedure of prediction, transform, and reconstruction, which will be described later. As another example, the processing unit of the coding procedure may be a prediction unit (PU) or a transform unit (TU). The prediction unit and the transform unit may be split or partitioned from the final coding unit. The prediction unit may be a unit of sample prediction, and the transform unit may be a unit for deriving a transform coefficient and/or a unit for deriving a residual signal from the transform coefficient.

The predictor (the inter predictor 180 or the intra predictor 185) may perform prediction on a block to be processed (current block) and generate a predicted block including prediction samples for the current block. The predictor may determine whether intra prediction or inter prediction is applied on a current block or CU basis. The predictor may generate various information related to prediction of the current block and transmit the generated information to the entropy encoder 190. The information on the prediction may be encoded in the entropy encoder 190 and output in the form of a bitstream.

The intra predictor 185 may predict the current block by referring to the samples in the current picture. The referred samples may be located in the neighborhood of the current block or may be located apart according to the intra prediction mode and/or the intra prediction technique. The intra prediction modes may include a plurality of non-directional modes and a plurality of directional modes. The non-directional mode may include, for example, a DC mode and a planar mode. The directional mode may include, for example, 33 directional prediction modes or 65 directional prediction modes according to the degree of detail of the prediction direction. However, this is merely an example, more or less directional prediction modes may be used depending on a setting. The intra predictor 185 may determine the prediction mode applied to the current block by using a prediction mode applied to a neighboring block.

The inter predictor 180 may derive a predicted block for the current block based on a reference block (reference sample array) specified by a motion vector on a reference picture. In this case, in order to reduce the amount of motion information transmitted in the inter prediction mode, the motion information may be predicted in units of blocks, subblocks, or samples based on correlation of motion information between the neighboring block and the current block. The motion information may include a motion vector and a reference picture index. The motion information may further include inter prediction direction (L0 prediction, L1 prediction, Bi prediction, etc.) information. In the case of inter prediction, the neighboring block may include a spatial neighboring block present in the current picture and a temporal neighboring block present in the reference picture. The reference picture including the reference block and the reference picture including the temporal neighboring block may be the same or different. The temporal neighboring block may be called a collocated reference block, a co-located CU (colCU), and the like. The reference picture including the temporal neighboring block may be called a collocated picture (colPic). For example, the inter predictor 180 may configure a motion information candidate list based on neighboring blocks and generate information indicating which candidate is used to derive a motion vector and/or a reference picture index of the current block. Inter prediction may be performed based on various prediction modes. For example, in the case of a skip mode and a merge mode, the inter predictor 180 may use motion information of the neighboring block as motion information of the current block. In the case of the skip mode, unlike the merge mode, the residual signal may not be transmitted. In the case of the motion vector prediction (MVP) mode, the motion vector of the neighboring block may be used as a motion vector predictor, and the motion vector of the current block may be signaled by encoding a motion vector difference and an indicator for a motion vector predictor. The motion vector difference may mean a difference between the motion vector of the current block and the motion vector predictor.

The predictor may generate a prediction signal based on various prediction methods and prediction techniques described below. For example, the predictor may not only apply intra prediction or inter prediction but also simultaneously apply both intra prediction and inter prediction, in order to predict the current block. A prediction method of simultaneously applying both intra prediction and inter prediction for prediction of the current block may be called combined inter and intra prediction (CIIP). In addition, the predictor may perform intra block copy (IBC) for prediction of the current block. Intra block copy may be used for content video/image coding of a game or the like, for example, screen content coding (SCC). IBC is a method of predicting a current picture using a previously reconstructed reference block in the current picture at a location apart from the current block by a predetermined distance. When IBC is applied, the location of the reference block in the current picture may be encoded as a vector (block vector) corresponding to the predetermined distance. IBC basically performs prediction in the current picture, but may be performed similarly to inter prediction in that a reference block is derived within the current picture. That is, IBC may use at least one of the inter prediction techniques described in the present disclosure.

The prediction signal generated by the predictor may be used to generate a reconstructed signal or to generate a residual signal. The subtractor 115 may generate a residual signal (residual block or residual sample array) by subtracting the prediction signal (predicted block or prediction sample array) output from the predictor from the input image signal (original block or original sample array). The generated residual signal may be transmitted to the transformer 120.

The transformer 120 may generate transform coefficients by applying a transform technique to the residual signal. For example, the transform technique may include at least one of a discrete cosine transform (DCT), a discrete sine transform (DST), a karhunen-loève transform (KLT), a graph-based transform (GBT), or a conditionally non-linear transform (CNT). Here, the GBT means transform obtained from a graph when relationship information between pixels is represented by the graph. The CNT refers to transform acquired based on a prediction signal generated using all previously reconstructed pixels. In addition, the transform process may be applied to square pixel blocks having the same size or may be applied to blocks having a variable size rather than square.

The quantizer 130 may quantize the transform coefficients and transmit them to the entropy encoder 190. The entropy encoder 190 may encode the quantized signal (information on the quantized transform coefficients) and output a bitstream. The information on the quantized transform coefficients may be referred to as residual information. The quantizer 130 may rearrange quantized transform coefficients in a block type into a one-dimensional vector form based on a coefficient scanning order and generate information on the quantized transform coefficients based on the quantized transform coefficients in the one-dimensional vector form.

The entropy encoder 190 may perform various encoding methods such as, for example, exponential Golomb, context-adaptive variable length coding (CAVLC), context-adaptive binary arithmetic coding (CABAC), and the like. The entropy encoder 190 may encode information necessary for video/image reconstruction other than quantized transform coefficients (e.g., values of syntax elements, etc.) together or separately. Encoded information (e.g., encoded video/image information) may be transmitted or stored in units of network abstraction layers (NALs) in the form of a bitstream. The video/image information may further include information on various parameter sets such as an adaptation parameter set (APS), a picture parameter set (PPS), a sequence parameter set (SPS), or a video parameter set (VPS). In addition, the video/image information may further include general constraint information. The signaled information, transmitted information and/or syntax elements described in the present disclosure may be encoded through the above-described encoding procedure and included in the bitstream.

The bitstream may be transmitted over a network or may be stored in a digital storage medium. The network may include a broadcasting network and/or a communication network, and the digital storage medium may include various storage media such as USB, SD, CD, DVD, Blu-ray, HDD, SSD, and the like. A transmitter (not shown) transmitting a signal output from the entropy encoder 190 and/or a storage unit (not shown) storing the signal may be included as internal/external element of the image encoding apparatus 100. Alternatively, the transmitter may be provided as the component of the entropy encoder 190.

The quantized transform coefficients output from the quantizer 130 may be used to generate a residual signal. For example, the residual signal (residual block or residual samples) may be reconstructed by applying dequantization and inverse transform to the quantized transform coefficients through the dequantizer 140 and the inverse transformer 150.

The adder 155 adds the reconstructed residual signal to the prediction signal output from the inter predictor 180 or the intra predictor 185 to generate a reconstructed signal (reconstructed picture, reconstructed block, reconstructed sample array). If there is no residual for the block to be processed, such as a case where the skip mode is applied, the predicted block may be used as the reconstructed block. The adder 155 may be called a reconstructor or a reconstructed block generator. The generated reconstructed signal may be used for intra prediction of a next block to be processed in the current picture and may be used for inter prediction of a next picture through filtering as described below.

Meanwhile, as described later, luma mapping with chroma scaling (LMCS) may be applied in the picture encoding process.

The filter 160 may improve subjective/objective image quality by applying filtering to the reconstructed signal. For example, the filter 160 may generate a modified reconstructed picture by applying various filtering methods to the reconstructed picture and store the modified reconstructed picture in the memory 170, specifically, a DPB of the memory 170. The various filtering methods may include, for example, deblocking filtering, a sample adaptive offset, an adaptive loop filter, a bilateral filter, and the like. The filter 160 may generate various information related to filtering and transmit the generated information to the entropy encoder 190 as described later in the description of each filtering method. The information related to filtering may be encoded by the entropy encoder 190 and output in the form of a bitstream.

The modified reconstructed picture transmitted to the memory 170 may be used as the reference picture in the inter predictor 180. When inter prediction is applied through the image encoding apparatus 100, prediction mismatch between the image encoding apparatus 100 and the image decoding apparatus may be avoided and encoding efficiency may be improved.

The DPB of the memory 170 may store the modified reconstructed picture for use as a reference picture in the inter predictor 180. The memory 170 may store the motion information of the block from which the motion information in the current picture is derived (or encoded) and/or the motion information of the blocks in the picture that have already been reconstructed. The stored motion information may be transmitted to the inter predictor 180 and used as the motion information of the spatial neighboring block or the motion information of the temporal neighboring block. The memory 170 may store reconstructed samples of reconstructed blocks in the current picture and may transfer the reconstructed samples to the intra predictor 185.

Overview of Image Decoding Apparatus

Figure 3:
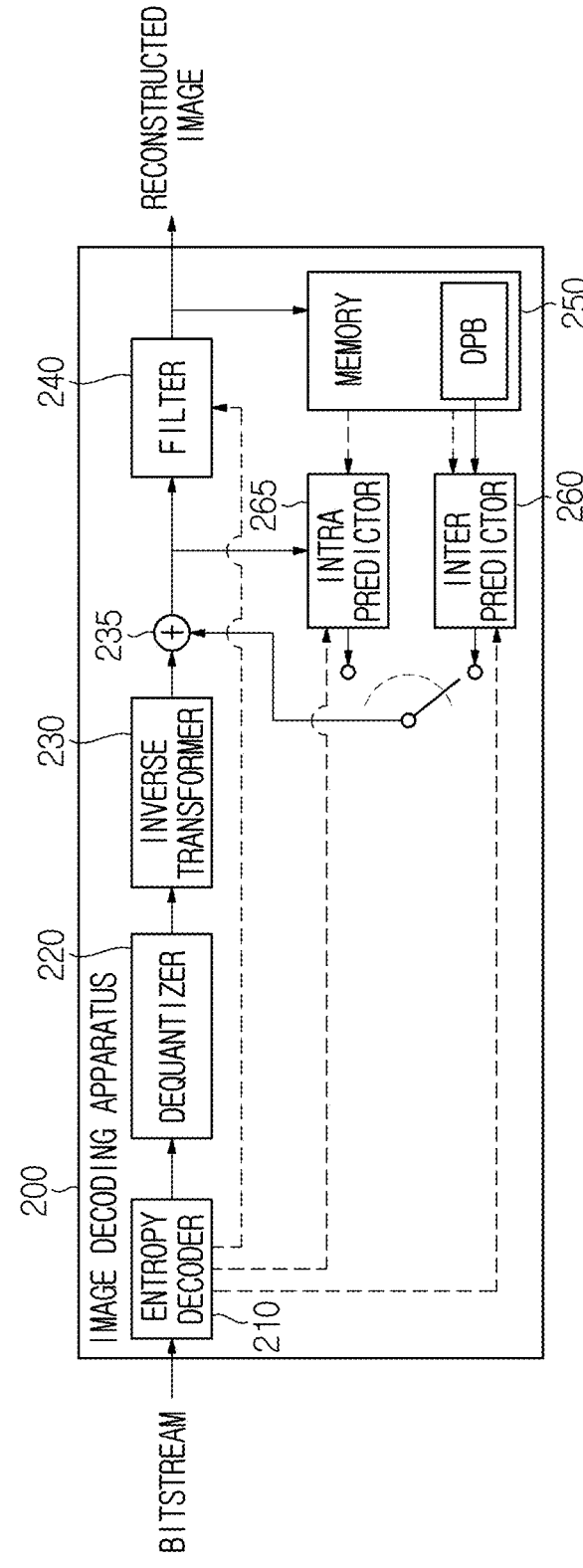
FIG. 3 is a view schematically illustrating an image decoding apparatus according to an embodiment.

FIG. 3 is a view schematically illustrating an image decoding apparatus according to an embodiment. As shown in FIG. 3, the image decoding apparatus 200 may include an entropy decoder 210, a dequantizer 220, an inverse transformer 230, an adder 235, a filter 240, a memory 250, an inter predictor 260 and an intra predictor 265. The inter predictor 260 and the intra predictor 265 may be collectively referred to as a "predictor". The dequantizer 220 and the inverse transformer 230 may be included in a residual processor.

All or at least some of a plurality of components configuring the image decoding apparatus 200 may be configured by a hardware component (e.g., a decoder or a processor) according to an embodiment. In addition, the memory 250 may include a decoded picture buffer (DPB) or may be configured by a digital storage medium.

The image decoding apparatus 200, which has received a bitstream including video/image information, may reconstruct an image by performing a process corresponding to a process performed by the image encoding apparatus 100 of FIG. 2. For example, the image decoding apparatus 200 may perform decoding using a processing unit applied in the image encoding apparatus. Thus, the processing unit of decoding may be a coding unit, for example.

The image decoding apparatus 200 may receive a signal output from the image encoding apparatus of FIG. 2 in the form of a bitstream. The received signal may be decoded through the entropy decoder 210. For example, the entropy decoder 210 may parse the bitstream to derive information (e.g., video/image information) necessary for image reconstruction (or picture reconstruction). The video/image information may further include information on various parameter sets such as an adaptation parameter set (APS), a picture parameter set (PPS), a sequence parameter set (SPS), or a video parameter set (VPS). In addition, the video/image information may further include general constraint information. The image decoding apparatus may further decode picture based on the information on the parameter set and/or the general constraint information. Signaled/received information and/or syntax elements described in the present disclosure may be decoded through the decoding procedure and obtained from the bitstream. For example, the entropy decoder 210 decodes the information in the bitstream based on a coding method such as exponential Golomb coding, CAVLC, or CABAC, and output values of syntax elements required for image reconstruction and quantized values of transform coefficients for residual. More specifically, the CABAC entropy decoding method may receive a bin corresponding to each syntax element in the bitstream, determine a context model using a decoding target syntax element information, decoding information of a neighboring block and a decoding target block or information of a symbol/bin decoded in a previous stage, and perform arithmetic decoding on the bin by predicting a probability of occurrence of a bin according to the determined context model, and generate a symbol corresponding to the value of each syntax element. In this case, the CABAC entropy decoding method may update the context model by using the information of the decoded symbol/bin for a context model of a next symbol/bin after determining the context model. The information related to the prediction among the information decoded by the entropy decoder 210 may be provided to the predictor (the inter predictor 260 and the intra predictor 265), and the residual value on which the entropy decoding was performed in the entropy decoder 210, that is, the quantized transform coefficients and related parameter information, may be input to the dequantizer 220. In addition, information on filtering among information decoded by the entropy decoder 210 may be provided to the filter 240. Meanwhile, a receiver (not shown) for receiving a signal output from the image encoding apparatus may be further configured as an internal/external element of the image decoding apparatus 200, or the receiver may be a component of the entropy decoder 210.

Meanwhile, the image decoding apparatus according to the present disclosure may be referred to as a video/image/picture decoding apparatus. The image decoding apparatus may be classified into an information decoder (video/image/picture information decoder) and a sample decoder (video/image/picture sample decoder). The information decoder may include the entropy decoder 210. The sample decoder may include at least one of the dequantizer 220, the inverse transformer 230, the adder 235, the filter 240, the memory 250, the inter predictor 160 or the intra predictor.

The dequantizer 220 may dequantize the quantized transform coefficients and output the transform coefficients. The dequantizer 220 may rearrange the quantized transform coefficients in the form of a two-dimensional block. In this case, the rearrangement may be performed based on the coefficient scanning order performed in the image encoding apparatus. The dequantizer 220 may perform dequantization on the quantized transform coefficients by using a quantization parameter (e.g., quantization step size information) and obtain transform coefficients.

The inverse transformer 230 may inversely transform the transform coefficients to obtain a residual signal (residual block, residual sample array).

The predictor may perform prediction on the current block and generate a predicted block including prediction samples for the current block. The predictor may determine whether intra prediction or inter prediction is applied to the current block based on the information on the prediction output from the entropy decoder 210 and may determine a specific intra/inter prediction mode (prediction technique).

It is the same as described in the predictor of the image encoding apparatus 100 that the predictor may generate the prediction signal based on various prediction methods (techniques) which will be described later.

The intra predictor 265 may predict the current block by referring to the samples in the current picture. The description of the intra predictor 185 is equally applied to the intra predictor 265.

The inter predictor 260 may derive a predicted block for the current block based on a reference block (reference sample array) specified by a motion vector on a reference picture. In this case, in order to reduce the amount of motion information transmitted in the inter prediction mode, motion information may be predicted in units of blocks, subblocks, or samples based on correlation of motion information between the neighboring block and the current block. The motion information may include a motion vector and a reference picture index. The motion information may further include inter prediction direction (L0 prediction, L1 prediction, Bi prediction, etc.) information. In the case of inter prediction, the neighboring block may include a spatial neighboring block present in the current picture and a temporal neighboring block present in the reference picture.

For example, the inter predictor 260 may configure a motion information candidate list based on neighboring blocks and derive a motion vector of the current block and/or a reference picture index based on the received candidate selection information. Inter prediction may be performed based on various prediction modes, and the information on the prediction may include information indicating a mode of inter prediction for the current block.

The adder 235 may generate a reconstructed signal (reconstructed picture, reconstructed block, reconstructed sample array) by adding the obtained residual signal to the prediction signal (predicted block, predicted sample array) output from the predictor (including the inter predictor 260 and/or the intra predictor 265). If there is no residual for the block to be processed, such as when the skip mode is applied, the predicted block may be used as the reconstructed block. The description of the adder 155 is equally applicable to the adder 235. The adder 235 may be called a reconstructor or a reconstructed block generator. The generated reconstructed signal may be used for intra prediction of a next block to be processed in the current picture and may be used for inter prediction of a next picture through filtering as described below.

Meanwhile, as described later, luma mapping with chroma scaling (LMCS) may be applied in the picture decoding process.

The filter 240 may improve subjective/objective image quality by applying filtering to the reconstructed signal. For example, the filter 240 may generate a modified reconstructed picture by applying various filtering methods to the reconstructed picture and store the modified reconstructed picture in the memory 250, specifically, a DPB of the memory 250. The various filtering methods may include, for example, deblocking filtering, a sample adaptive offset, an adaptive loop filter, a bilateral filter, and the like.

The (modified) reconstructed picture stored in the DPB of the memory 250 may be used as a reference picture in the inter predictor 260. The memory 250 may store the motion information of the block from which the motion information in the current picture is derived (or decoded) and/or the motion information of the blocks in the picture that have already been reconstructed. The stored motion information may be transmitted to the inter predictor 260 so as to be utilized as the motion information of the spatial neighboring block or the motion information of the temporal neighboring block. The memory 250 may store reconstructed samples of reconstructed blocks in the current picture and transfer the reconstructed samples to the intra predictor 265.

In the present disclosure, the embodiments described in the filter 160, the inter predictor 180, and the intra predictor 185 of the image encoding apparatus 100 may be equally or correspondingly applied to the filter 240, the inter predictor 260, and the intra predictor 265 of the image decoding apparatus 200. The embodiments described in the filtering unit 240, the inter prediction unit 260, and the intra prediction unit 265 of the image decoding apparatus 200 may be applied to be the same or corresponding to the filtering unit 160 and the inter prediction unit 180 and the intra prediction unit 185 of the image encoding apparatus 100, respectively.

Overview of Intra Prediction

Hereinafter, an intra prediction method according to an embodiment will be described. Intra prediction may indicate prediction which generates prediction samples for a current block based on reference samples in a picture to which the current block belongs (hereinafter referred to as a current picture). When intra prediction applies to the current block, neighboring reference samples to be used for intra prediction of the current block may be derived. The neighboring reference samples of the current block may include a sample adjacent to a left boundary of the current block having a size of nW×nH and a total of 2×nH samples neighboring to the bottom-left, a sample adjacent to a top boundary of the current block and a total of 2×nW samples neighboring to the top-right, and one sample neighboring the top-left of the current block. Alternatively, the neighboring reference samples of the current block may include a plurality of columns of top neighboring samples and a plurality of rows of left neighboring samples. In addition, the neighboring reference samples of the current block may include a total of nH samples adjacent to a right boundary of the current block having a size of nW×nH, a total of nW samples adjacent to a bottom boundary of the current block, and one sample neighboring the bottom-right of the current block. Meanwhile, when ISP which will be described later is applied, the neighboring reference samples may be derived in units of sub-partitions.

On the other hand, some of the neighboring reference samples of the current block have not yet been decoded or may not be available. In this case, a decoding apparatus may construct neighboring reference samples to be used for prediction, by substituting unavailable samples with available samples. Alternatively, neighboring reference samples to be used for prediction may be constructed using interpolation of available samples.

When the neighboring reference samples are derived, (i) a prediction sample may be derived based on average or interpolation of neighboring reference samples of the current block and (ii) the prediction sample may be derived based on a reference sample present in a specific (prediction) direction with respect to the prediction sample among the neighboring reference samples of the current block. The case of (i) may be referred to as a non-directional mode or a non-angular mode and the case of (ii) may be referred to as a directional mode or an angular mode. In addition, the prediction sample may be generated through interpolation with a second neighboring sample and a first neighboring sample located in the opposite direction of the prediction direction of the intra prediction mode of the current block based on the prediction sample of the current block among the neighboring reference samples. The above-described case may be referred to as linear interpolation intra prediction (LIP). In addition, chroma prediction samples may be generated based on luma samples using a linear model. This case may be called an LM mode. In addition, a temporary prediction sample of the current block may be derived based on filtered neighboring reference samples, and the prediction sample of the current block may be derived by weighted-summing the temporary prediction sample and at least one reference sample derived according to the intra prediction mode among the existing neighboring reference samples, that is, the unfiltered neighboring reference samples. The above-described case may be referred to as position dependent intra prediction (PDPC). In addition, a reference sample line with highest prediction accuracy may be selected from multiple neighboring reference sample lines of the current block to derive a prediction sample using a reference sample located in a prediction direction in the corresponding line, and, at this time, intra prediction encoding may be performed by indicating (signaling) the used reference sample line to a decoding apparatus. The above-described case may be referred to as multi-reference line (MRL) intra prediction or MRL based intra prediction. In addition, the current block may be divided into vertical or horizontal sub-partitions to perform intra prediction based on the same intra prediction mode, and neighboring reference samples may be derived and used in units of sub-partitions. That is, in this case, the intra prediction mode for the current block is equally applied to the sub-partitions and the neighboring reference samples are derived and used in units of sub-partitions, thereby increasing intra prediction performance. Such a prediction method may be referred to as intra sub-partitions (ISP) or ISP based intra prediction. In addition, when a prediction direction based on the prediction sample indicates a space between neighboring reference samples, that is, when the prediction direction indicates a fractional sample position, the value of the prediction sample may be derived through interpolation of a plurality of reference samples located around the prediction direction (around the fractional sample position). The above-described intra prediction methods may be referred to as intra prediction type to be distinguished from the intra prediction mode. In addition, after a prediction signal for a sub-sampled pixel set of the current block is generated using reconstructed neighboring pixels located on the left and top of the current block, the generated prediction signal and the neighboring sample value may be interpolated in the vertical and horizontal direction to generate the prediction signal having an original size, thereby applying matrix-weighted intra prediction (MIP) for performing intra prediction of the current block.

The intra prediction type may be referred to as various terms such as intra prediction scheme or additional intra prediction mode. For example, the intra prediction type (or the additional intra prediction mode) may include at least one of LIP, PDPC, MRL, ISP or MIP. Information on the intra prediction type may be encoded by an encoding apparatus, included in a bitstream and signaled to a decoding apparatus. Information on the intra prediction type may be implemented in various forms such as flag information indicating whether to apply each intra prediction type or index information indicating one of several intra prediction types.

Meanwhile, if necessary, post-filtering may be performed with respect to the derived prediction sample. Specifically, the intra prediction procedure may include an intra prediction mode/type determination step, a neighboring reference sample derivation step and an intra prediction mode/type based prediction sample derivation step. In addition, if necessary, post-filtering may be performed with respect to the derived prediction sample.

Hereinafter, a video/image encoding method based on intra prediction will be described. First, the encoding apparatus performs intra prediction with respect to a current block. The encoding apparatus may derive an intra prediction mode/type for the current block, derive neighboring reference samples of the current block, and generate prediction samples in the current block based on the intra prediction mode/type and the neighboring reference samples. Here, the intra prediction mode/type determination, neighboring reference samples derivation and prediction samples generation procedures may be simultaneously performed or any one procedure may be performed before the other procedures. Meanwhile, when the below-described prediction sample filtering procedure is performed, an intra predictor 185 may further include a prediction sample filter. The encoding apparatus may determine a mode/type applied to the current block among a plurality of intra prediction modes/types. The encoding apparatus may compare ratedistortion (RD) costs for the intra prediction modes/types and determine an optimal intra prediction mode/type for the current block.

Meanwhile, the encoding apparatus may perform a prediction sample filtering procedure. Prediction sample filtering may be referred to as post-filtering. By the prediction sample filtering procedure, some or all of the prediction samples may be filtered. In some cases, the prediction sample filtering procedure may be omitted.

Next, the encoding apparatus may generate residual samples for the current block based on the prediction samples. The encoding apparatus may compare the original samples of the current block with the prediction samples in terms of phase and derive the residual samples.

Next, the encoding apparatus may encode image information including information on the intra prediction (prediction information) and residual information on the residual samples. The prediction information may include the intra prediction mode information and the intra prediction type information. The encoding apparatus may output the encoded image information in the form of a bitstream. The output bitstream may be transmitted to the decoding apparatus through a storage medium or a network.

The residual information may include residual coding syntax, which will be described later. The encoding apparatus may transform/quantize the residual samples and derive quantized transform coefficients. The residual information may include information on the quantized transform coefficients.

Meanwhile, as described above, the encoding apparatus may generate a reconstructed picture (including reconstructed samples and reconstructed blocks). To this end, the encoding apparatus may perform inverse quantize/inverse transform with respect to the quantized transform coefficients and derive (modified) residual samples. The reason for transforming/quantizing the residual samples and then performing inverse quantization/inverse transform is to derive the same residual samples as residual samples derived by the decoding apparatus as described above. The encoding apparatus may generate a reconstructed bock including reconstructed samples for the current block based on the prediction samples and the (modified) residual samples. Based on the reconstructed block, the reconstructed picture for the current picture may be generated. As described above, an in-loop filtering procedure is applicable to the reconstructed picture.

Hereinafter, a video/image encoding method based on intra prediction will be described. The decoding apparatus may perform operation corresponding to operation performed by the encoding apparatus.

First, the decoding apparatus may derive an intra prediction mode/type for the current block based on the received prediction information (intra prediction mode/type information). The decoding apparatus may derive neighboring reference samples of the current block. The decoding apparatus may generate prediction samples in the current block based on the intra prediction mode/type and the neighboring reference samples. In this case, the decoding apparatus may perform a prediction sample filtering procedure. Prediction sample filtering may be referred to as post-filtering. By the prediction sample filtering procedure, some or all of the prediction samples may be filtered. In some cases, the prediction sample filtering procedure may be omitted.

The decoding apparatus may generate residual samples for the current block based on the received residual information. The decoding apparatus may generate reconstructed samples for the current block based on the prediction samples and the residual samples and derive a reconstructed block including the reconstructed samples. Based on the reconstructed block, the reconstructed picture for the current picture may be generated. An in-loop filtering procedure is further applicable to the reconstructed picture.

The intra prediction mode information may include, for example, flag information (e.g., intra_luma_mpm_flag) indicating whether a most probable mode (MPM) or a remaining mode is applied to the current block, and, when the MPM is applied to the current block, the prediction mode information may further include index information (e.g., intra_luma_mpm_idx) indicating one of the intra prediction mode candidates (MPM candidates). The intra prediction mode candidates (MPM candidates) may configure an MPM candidate list or an MPM list. For example, the MPM candidate list may include an intra prediction mode of a neighboring block or a preset basic intra prediction mode. In addition, when the MPM is not applied to the current block, the intra prediction mode information may further include remaining mode information (e.g., intra_luma_mpm_remainder) indicating one of the remaining intra prediction modes excluding the intra prediction mode candidates (MPM candidates). The decoding apparatus may determine the intra prediction mode of the current block based on the intra prediction mode information.

In addition, the intra prediction type information may be implemented in various forms. For example, the intra prediction type information may include intra prediction type index information indicating one of the intra prediction types. As another example, the intra prediction type information may include at least one of reference sample line information (e.g., intra_luma_ref_idx) indicating whether the MRL is applied to the current block and, if applied, which reference sample line is used, ISP flag information (e.g., intra_subpartitions_mode_flag) indicating whether the ISP is applied to the current block, ISP type information (e.g., intra_subpartitions_split_flag) indicating the split type of the sub-partitions when the ISP is applied, flag information indicating whether PDPC is applied or flag information indicating whether LIP is applied.

The intra prediction mode information and/or the intra prediction type information may be encoded/decoded through the coding method described in the present disclosure. For example, the intra prediction mode information and/or the intra prediction type information may be encoded/decoded through entropy coding (e.g., CABAC, CAVLC) based on a truncated (rice) binary code.

Figure 4:
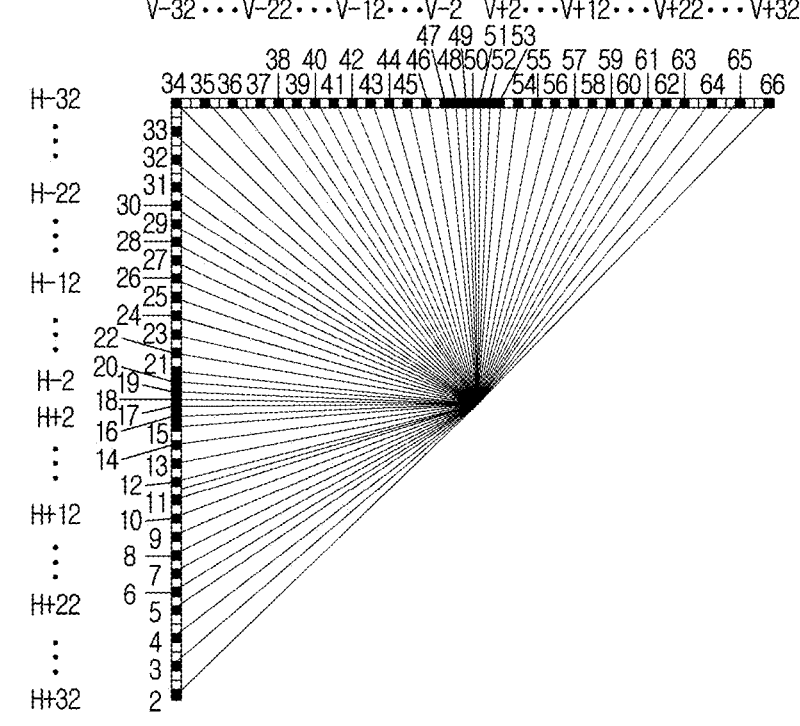
FIGS. 4 and 5 are views illustrating an intra prediction direction according to an embodiment.

Hereinafter, the intra prediction mode will be in greater detail. FIG. 4 shows an intra prediction direction according to an embodiment. In order to capture any edge direction presented in natural video, as shown in FIG. 4, the intra prediction mode may include two non-directional intra prediction modes and 65 directional intra prediction modes. The non-directional intra prediction modes may include a planar intra prediction mode and a DC intra prediction mode, and the directional intra prediction modes may include second to $66^{th}$ intra prediction modes.

Meanwhile, the intra prediction mode may further include a cross-component linear model (CCLM) mode for chroma samples in addition to the above-described intra prediction modes. The CCLM mode may be split into L_CCLM, T_CCLM, LT_CCLM according to whether left samples, upper samples or both thereof are considered for LM parameter derivation and may be applied only to a chroma component. For example, the intra prediction mode may be indexed as shown in the following table.

TABLE 1

| Intra prediction mode | Associated name |
| --- | --- |
| 0 | INTRA_PLANAR |
| 1 | INTRA_DC |
| 2 . . . 66 | INTRA_ANGULAR2 . . . INTRA_ANGULAR66 |
| 81 . . . 83 | INTRA_LT_CCLM, INTRA_L_CCLM, INTRA_T_CCLM |

Figure 5:
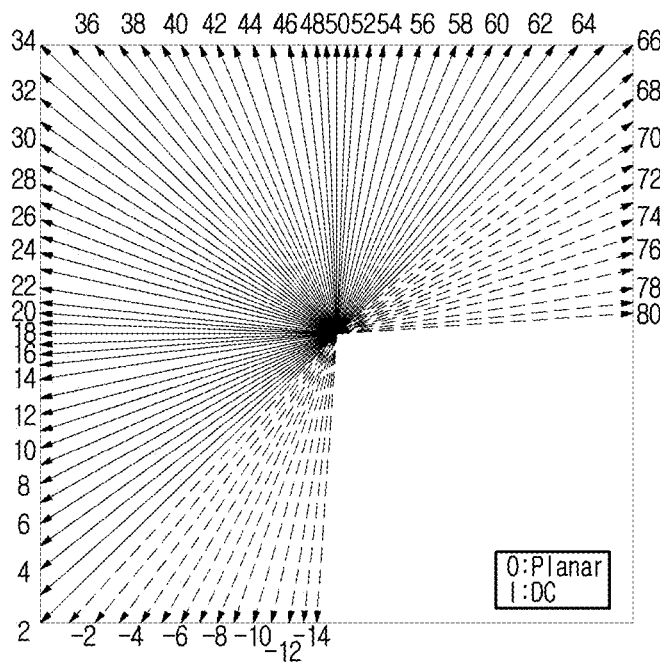

FIG. 5 shows an intra prediction direction according to another embodiment. Here, a dotted-line direction shows a wide angle mode applied only to a non-square block. As shown in FIG. 5, in order to capture any edge direction presented in natural video, the intra prediction mode according to an embodiment may include two non-directional intra prediction modes and 93 directional intra prediction modes. The non-directional intra prediction modes may include a planar intra prediction mode and a DC intra prediction mode, and the directional intra prediction modes may include second to $80^{th}$ and $-1^{st}$ to $-14^{th}$ intra prediction modes, as denoted by arrow of FIG. 5. The planar prediction mode may be denoted by INTRA_PLANAR, and the DC prediction mode may be denoted by INTRA_DC. In addition, the directional intra prediction mode may be denoted by INTRA_ANGULAR−14 to INTRA_ANGULAR−1 and INTRA_ANGULAR2 to INTRA_ANGULAR80.

Meanwhile, the intra prediction type (or the additional intra prediction mode) may include at least one of LIP, PDPC, MRL, ISP or MIP. The intra prediction type may be indicated based on intra prediction type information, and the intra prediction type information may be implemented in various forms. For example, the intra prediction type information may include intra prediction type index information indicating one of the intra prediction types. As another example, the intra prediction type information may include at least one of reference sample line information (e.g., intra_luma_ref_idx) indicating whether the MRL is applied to the current block and, if applied, which reference sample line is used, ISP flag information (e.g., intra_subpartitions_mode_flag) indicating whether the ISP is applied to the current block, ISP type information (e.g., intra_subpartitions_split_flag) indicating the split type of the sub-partitions when the ISP is applied, flag information indicating whether PDPC is applied, flag information indicating whether LIP is applied or MIP flag information indicating whether MIP is applied.

Hereinafter, reference sample filtering will be described in greater detail. Filtering is applicable to the neighboring reference samples of the current block. This may be referred to as pre-filtering because it is applied to the neighboring reference samples before intra prediction unlike post-filtering which is filtering applied to the prediction sample after intra prediction. Filtering of the neighboring reference samples may be performed, for example, as shown in the following equation.

A filtered sample value p[x][y] may be derived as follows. Here, x=−1, y=−1 to refH−1 and x=0 to refW−1, y=−1. refH may be determined as twice the height of the transform block or the coding block, and refW may be determined as twice the width of the transform block or the coding block.

$$p[-1][-1] = (refUnfilt[-1][0] + \qquad \text{[Equation 1]}$$

$$2 * refUnfilt[-1][-1] + refUnfilt[0][-1] + 2) \gg 2$$

-continued $$p[-1][y] = (refUnfilt[-1][y + 1] + 2 * refUnfilt[-1][y] + \qquad \text{[Equation 2]}$$

$$refUnfilt[-1][y - 1] + 2) \gg 2, \text{where, } y = 0 \text{ to } refH - 2.$$

$$p[-1][refH - 1] = refUnfilt[-1][refH - 1] \qquad \text{[Equation 3]}$$

$$p[x][-1] = (refUnflit[x - 1][-1] + 2 * refUnfilt[x][-1] + \qquad \text{[Equation 4]}$$

$$refUnflit[x + 1][-1] + 2) \gg 2, \text{where, } x = 0 \text{ to } refW - 2.$$

$$p[refW - 1][-1] = refUnfilt[refW - 1][-1] \qquad \text{[Equation 5]}$$

where, refUnfilt denotes neighboring reference samples which have not yet been filtered, and [x][y] denotes x and y coordinates of the corresponding sample. For example, this may indicate coordinates when the top-left sample position coordinates of the current block are (0, 0).

When filtering is applied to the neighboring reference samples, the filtered neighboring reference samples may be used as reference samples in the prediction sample derivation step and, when filtering is not applied to the neighboring reference samples, the unfiltered neighboring reference samples may be used as the reference samples in the prediction sample derivation step.

Neighboring reference sample filtering is applicable, for example, when some or all of the following specific conditions are satisfied.

(Condition 1) nTbW*nTbH is greater than 32. where, nTbW denotes the width of a TB, that is, the width of the transform block (current block), nTbH denotes the height of a TB, that is, the height of the transform block (current block).

(Condition 2) The value of cIdx is 0. cIdx denotes the color component of the current block and a value of 0 denotes a luma component.

(Condition 3) IntraSubPartitionsSplitType denotes non-split (ISP_NO_SPLIT). Here, IntraSubPartitionsSplitType is a parameter indicating the split type of the current luma coding block.

(Condition 4) At least one of the following conditions 4-1 to 4-4 is true.

(Condition 4-1) The value of predModeIntra indicating the intra prediction mode indicates a planar prediction mode (INTRA_PLANAR).

(Condition 4-2) The value of predModeIntra indicates a $34^{th}$ directional intra prediction mode (INTRA_ANGULAR34).

(Condition 4-3) The value of predModeIntra indicates a second directional intra prediction mode (INTRA_ANGULAR2), and the value of nTbH is greater than or equal to the value of nTbW.

(Condition 4-4) The value of predModeIntra is a $66^{th}$ directional intra prediction mode (INTRA_ANGULAR66), and the value of nTbW is greater than or equal to nTbH.

For example, the procedures such as intra prediction mode/type determination, neighboring reference sample derivation and prediction sample derivation may all be performed in units of CUs. As another example, intra prediction mode/type determination may be performed in units of CUs, whereas the neighboring reference sample derivation and prediction sample derivation procedures may be performed in units of TUs in the CU. In this case, the TUs in the CU may share the same intra prediction mode/type. Accordingly, in consideration of this case, whether to perform neighboring reference sample filtering may be determined in consideration of nTbW and nTbH which are the width and height of the TU (or TB).

Overview of Intra Prediction Process, to which Reference Sample Filtering is Applied Hereinafter, an intra prediction method, to which sample filtering is applied, according to an embodiment will be described. When a reference sample is filtered using a smoothing filter, the value of the reference sample has smoothly changing characteristics. Nevertheless, when intra prediction is performed with respect to a current sample by applying a filter having a sharpening characteristic to the reference sample, the sharpening characteristic is added to the smoothed reference sample, thereby decreasing intra prediction efficiency. According to whether the reference sample is filtered using the smoothing filter, it is necessary to select a filter applied to the reference sample from between a smoothing filter and a sharpening filter in order to generate the intra prediction sample of the current sample. Thus, intra prediction efficiency may be improved by applying the smoothing filter to the reference sample, to which the smoothing filter is applied, to generate a prediction sample and applying the sharpening filter to the reference sample, to which the smoothing filter is not applied.

An intra prediction method performed by a decoding apparatus according to an embodiment may determine the type of a filter used when intra prediction is performed according to whether to apply reference sample filtering. Accordingly, the decoding apparatus may efficiently generate the prediction sample by applying a filter suiting sample characteristics of the reference sample to the reference sample according to the reference sample filtering result.

Figure 6:
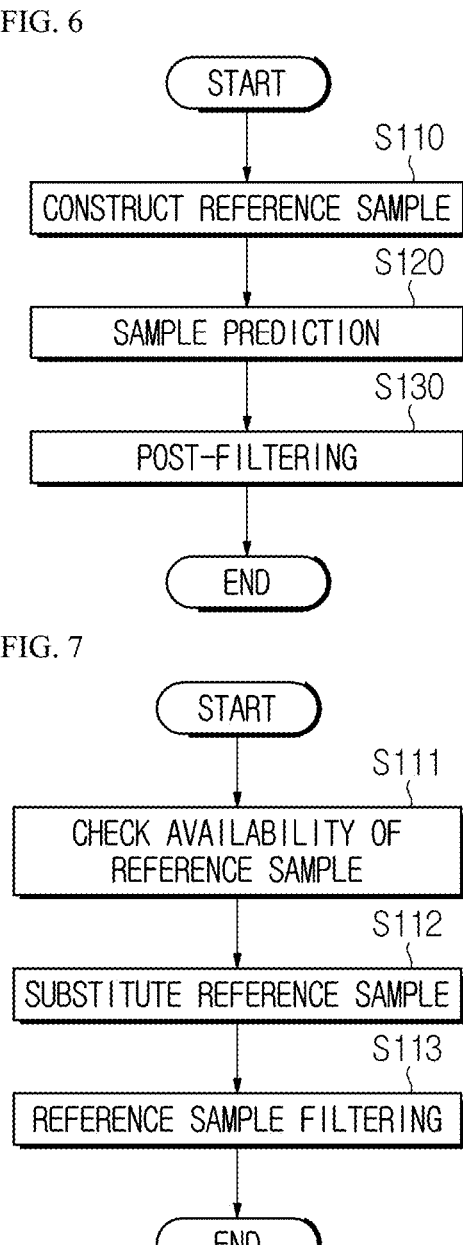
FIG. 6 is a flowchart illustrating an intra prediction step according to an embodiment.

FIG. 6 is a flowchart illustrating an intra prediction step according to an embodiment. As described above, intra prediction may include three main steps. First, a decoding apparatus according to an embodiment may construct a reference sample (S110). Then, the decoding apparatus may predict a sample value of a current block using the constructed reference sample (S120). The reference sample may be a sample located around the current block. The decoding apparatus may apply a post filter to an intra prediction sample generated by performing step S120 after intra sample prediction (S130).

FIG. 7 is a flowchart illustrating the reference sample construction step S110 according to an embodiment. The reference sample configuration step S110 will be described in greater detail with reference to FIG. 7. First, the decoding according to the embodiment may check availability of the reference sample (S111). Next, the decoding apparatus may determine whether to substitute the reference sample according to availability of the reference sample and perform substitution of the reference sample (S112). For example, when the reference sample is not available, the reference sample may be substituted with a value generated based on the neighboring available samples. Therefore, all reference samples may be constructed.

Thereafter, the decoding apparatus may filter the constructed reference sample according to the filtering condition of the reference sample (S113). When the size of an intra coding unit (CU) or transform unit (TU) is relatively large, the prediction result of the intra coding unit and transform unit may be relatively smooth. In this case, it may be desirable for reference sample filtering to be performed so that the generated intra prediction sample is smooth and planar.

Figures 8, 9:
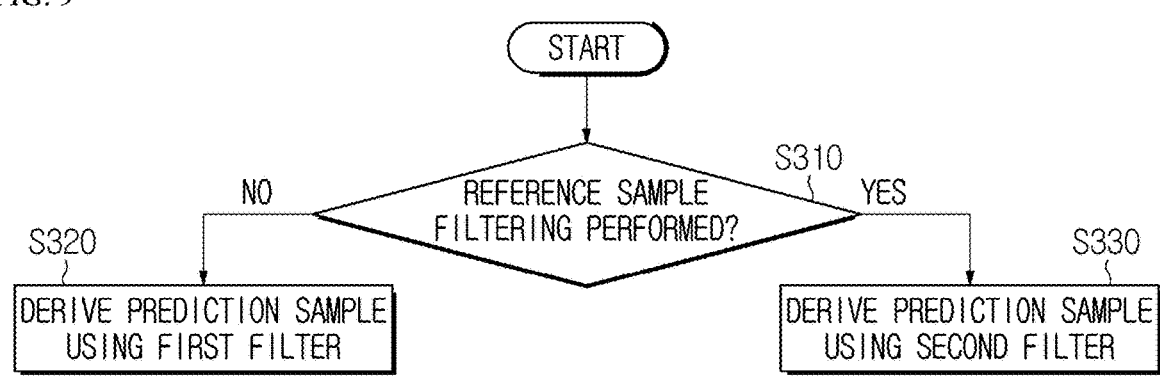
FIG. 8 is a flowchart illustrating a method of determining whether to perform reference sample filtering by a decoding apparatus according to an embodiment.
FIG. 9 is a flowchart illustrating a method of determining a filter used to derive a prediction sample depending on whether reference sample filtering has been performed by a decoding apparatus according to an embodiment.

Hereinafter, a reference sample filtering condition for intra prediction according to an embodiment will be described with reference to FIG. 8. FIG. 8 is a flowchart illustrating a method of determining whether to perform reference sample filtering by a decoding apparatus according to an embodiment in the reference sample filtering step S113 of the reference sample construction step S110. First, the decoding apparatus according to the embodiment may determine whether a condition for performing reference sample filtering is satisfied (S210). The decoding apparatus may not perform reference sample filtering (S220), when the condition for performing reference sample filtering is not satisfied. Meanwhile, the decoding apparatus may perform reference sample filtering (S230), when the condition for performing reference sample filtering is satisfied.

More specifically, the decoding apparatus may determine whether reference sample filtering is performed according to the following conditions. In an embodiment, the decoding apparatus may determine that the reference sample referenced for intra prediction of the current block is filtered when the following conditions are all true or at least one condition is true and, otherwise, may determine that filtering is not performed.

(Condition 1) A reference sample line closest to the current block is used for intra prediction. That is, the value of intra_luma_ref_idx is 0.

(Condition 2) The product of the width and height of a CU/TU is greater than 32.

(Condition 3) The current block relates to a luma component.

(Condition 4) An ISP (Intra Sub-Partitions) coding mode is not used.

(Condition 5) At least one of the following Condition 5-1 or Condition 5-2 is true. In the following, a second directional intra prediction mode may be referred to as a bottom-left diagonal mode, a $34^{th}$ directional intra prediction mode may be referred to as a top-left diagonal mode, a $66^{th}$ directional intra prediction mode may be referred to as a top-right diagonal mode, a $18^{th}$ directional intra prediction mode may be referred to as a horizontal mode, and a $50^{th}$ directional intra prediction mode may be referred to as a vertical mode.

(Condition 5-1) The product of the width and height of a CU/TU is equal to or less than 128, and the intra prediction mode corresponds to at least one of an intra planar mode (INTRA_PLANAR), an intra DC mdoe (INTRA_DC), a second directional intra prediction mode (INTRA_ANGULAR2) to a fourth directional intra prediction mode (INTRA_ANGULAR4), a $32^{nd}$ directional intra prediction mode (INTRA_ANGU-LAR32) to a $36^{th}$ directional intra prediction mode (INTRA_ANGULAR36), or a $64^{th}$ directional intra prediction mode (INTRA_ANGULAR64) to $66^{th}$ directional intra prediction mode (INTRA_ANGU-LAR66).

(Condition 5-2) The product of the width and height of a CU/TU is greater than 128, and the intra prediction mode is neither a $18^{th}$ directional intra prediction mode (INTRA_ANGULAR18) nor a 50$^{th}$ directional intra prediction mode (INTRA_ANGULAR50).

Meanwhile, the filter applied to the reference sample according to the above conditions may be a filter for smoothing the reference sample and may be, for example, a [1 2 1]/4 filter which will be described later. As described above, it may be advantageous that a filter applied to reference sample filtering and a filter used for intra prediction may have the same property. Accordingly, when intra prediction is performed using a reference sample smoothed by applying filtering, it may be inefficient to apply a filter having a sharp sample tendency. This is because, as the reference sample has a sharp tendency (e.g., edge), it has a sample value contrasting with neighboring sample values, whereas, as the reference sample has a smooth characteristic, it has a sample value similar to the neighboring sample values. Accordingly, when the reference sample filter is applied, a filter having a property which does not contradict the property of the reference sample filter needs to be used in the intra prediction sample generation step. For example, the smoothing filter which may be used in the intra prediction sample generation step may be any one of a 4-tap Gaussian filter or a linear interpolation filter, which will be described later.

Meanwhile, when the reference sample filter is not applied, the reference sample may not be smoothed. In this case, the non-smoothed reference sample may have a sharp tendency (e.g., edge). Similar to the above description, when intra prediction is performed using a reference sample having a sharp tendency, it may be inefficient to apply to a smoothing filter. Accordingly, when the reference sample filter is not applied, a filter used in the intra prediction sample generation step may be a sharpening filter. For example, the sharpening filter may be a cubic filter, which will be described later.

In this regard, a decoding apparatus according to an embodiment may determine a filter for predicting a sample value of a current block based on whether to perform reference sample filtering. Hereinafter, an embodiment in which a decoding apparatus according to an embodiment determines a filter used to derive a prediction sample depending on whether to perform reference sample filtering in the prediction sample generation step S120 of FIG. 6. FIG. 9 is a flowchart illustrating a method of determining a filter used to derive a prediction sample depending on whether reference sample filtering has been performed by a decoding apparatus according to an embodiment. The decoding apparatus according to the embodiment first determines whether reference sample filtering has been performed (310). Next, the decoding apparatus derives a prediction sample using a first filter (S320), when reference sample filtering has not been performed. Here, the first filter may be a sharpening filter and may be a cubic filter.

Next, the decoding apparatus derives a prediction sample using a second filter (S330), when reference sample filtering has been performed. Here, the second filter is a smoothing filter, and may be any one of a 4-tap Gaussian filter or a linear interpolation filter.

Overview of Reference Sample Filtering Performing Information Signaling

As described with reference to FIGS. 6 to 9, a filter applied in the prediction sample generation step S120 may vary depending on whether to perform reference sample filtering in the reference sample filtering step S113. Therefore, there is a need to signal whether to perform reference sample filtering in the reference sample filtering step S113 to the prediction sample generation step S120. Therefore, the decoding apparatus selects a filter applied to the prediction sample depending on whether to perform reference sample filtering in the reference sample filtering step S113, thereby increasing intra prediction efficiency.

In an embodiment, the decoding apparatus may signal, to the prediction sample generation step of the current block, whether to perform reference sample filtering using filterFlag which is a parameter indicating whether to perform reference sample filtering.

To this end, after the reference sample filtering step, filterFlag indicating whether the reference sample has been filtered may be input to the intra prediction mode step for directional intra prediction modes (intra angular modes) 2 to 66, which will be described later. For example, in directional intra prediction modes 2 to 66, the decoding apparatus may determine a filter for predicting the sample value of the current block using the received filterFlag.

Figure 10:
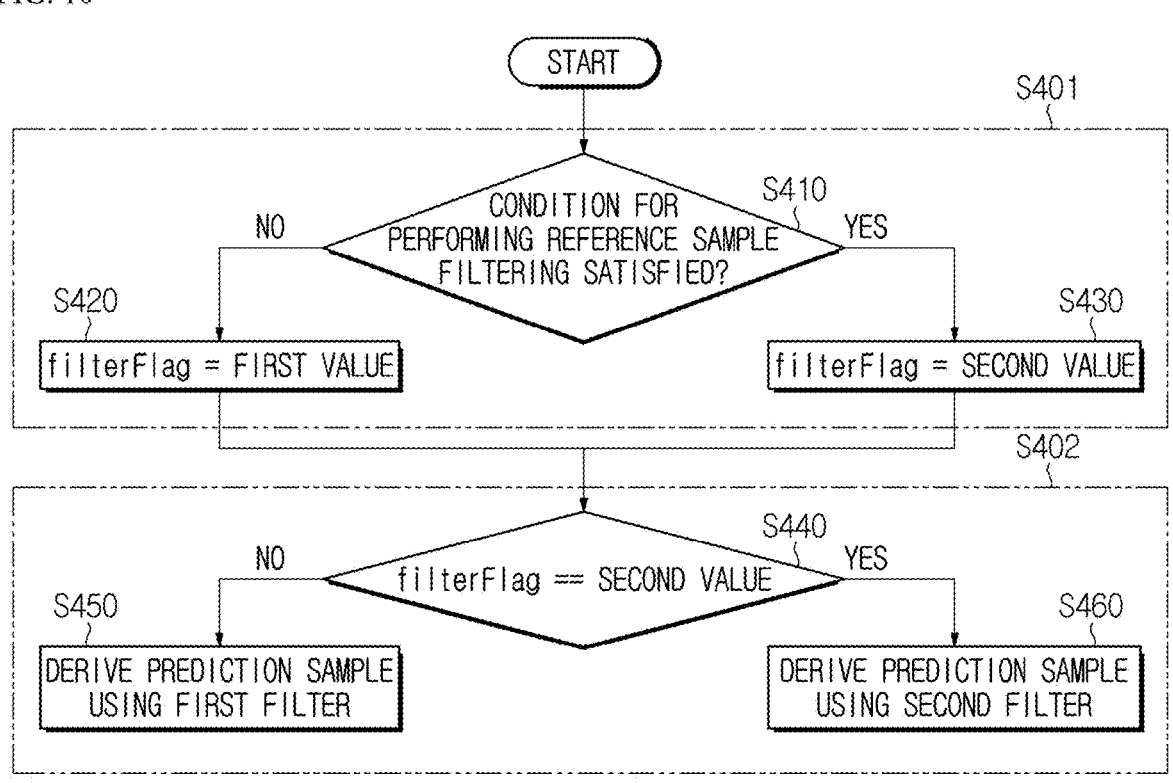
FIG. 10 is a flowchart illustrating a method of determining a filter used to derive a sample value of a current block using filterFlag as a parameter indicating whether to perform reference sample filtering by a decoding apparatus according to an embodiment.

Hereinafter, this will be described in greater detail with reference to FIG. 10. FIG. 10 is a flowchart illustrating a method of determining a filter used to derive a sample value of a current block using filterFlag as a parameter indicating whether to perform reference sample filtering by a decoding apparatus according to an embodiment. FIG. 10 shows the steps described above with reference to FIGS. 8 and 9. For example, the reference sample filtering step S401 may be performed in the reference sample filtering step S113 described with reference to FIG. 8, and the prediction sample generation step S402 may be performed in the prediction sample generation step S120 described with reference to FIG. 9.

First, the decoding apparatus according to the embodiment may determine whether a condition for performing reference sample filtering is satisfied (S410). The condition for performing reference sample filtering may include the above-described conditions. When the condition for performing reference sample filtering is not satisfied, the decoding apparatus according to the embodiment may set a value of filterFlag to a first value, and, in this case, the first value may be 0 (S420). Meanwhile, when the condition for performing reference sample filtering is satisfied and reference sample filtering is performed, the decoding apparatus according to the embodiment may set the value of filterFlag to a second value, and, in this case, the second value may be 1 (S430).

For example, the decoding apparatus according to the embodiment may set the value of filterFlag to a first value when filtering is not applied to the reference sample. In addition, the decoding apparatus according to the embodiment may set the value of filterFlag to a second value when filtering is applied to the reference sample. For example, the first value may be 0 and the second value may be 1. In this embodiment, the filterFlag value of 0 may indicate that reference sample filtering is not performed, and the filterFlag value of 1 may indicate that reference sample filtering is performed.

In one embodiment, the filterFlag value generated in the reference sample filtering step S410 may be signaled to the prediction sample generation step S402. The decoding apparatus according to the embodiment may receive and the filterFlag value generated in the reference sample filtering step S410 as a filterFlag parameter having the same parameter name in the prediction sample generation step S402.

The decoding apparatus according to the embodiment may determine a filter for generating a prediction sample based on the filterFlag value received from the reference sample filtering step, in the prediction sample generation step of the current block. For example, the decoding apparatus according to the embodiment may determine whether the filterFlag value received from the reference sample filtering step corresponds to a second value (S440). When the filterFlag value does not correspond to the second value, the decoding apparatus according to the embodiment may derive a prediction sample using a first filter (S450). The first filter may be a sharpening filter and may be a cubic filter. When the filterFlag value corresponds to the second value, the decoding apparatus according to the embodiment may derive a prediction sample using a second filter (S460). Here, the second filter is a smoothing filter, and may be any one of a 4-tap Gaussian filter or a linear interpolation filter.

More specifically, when the filterFlag value received from the reference sample filtering step is a first value indicating that filtering is not applied to the reference sample, the decoding apparatus according to the embodiment may determine that filtering is not applied to the reference sample and apply a sharpening filter to predict the sample value of the current block. Similarly, when the filterFlag value received from the reference sample filtering step is a second value indicating that filtering is applied to the intra reference sample, the decoding apparatus according to the embodiment may determine that filtering is applied to the intra reference sample and apply a smoothing filter to predict the sample value of the current block.

Figure 11:
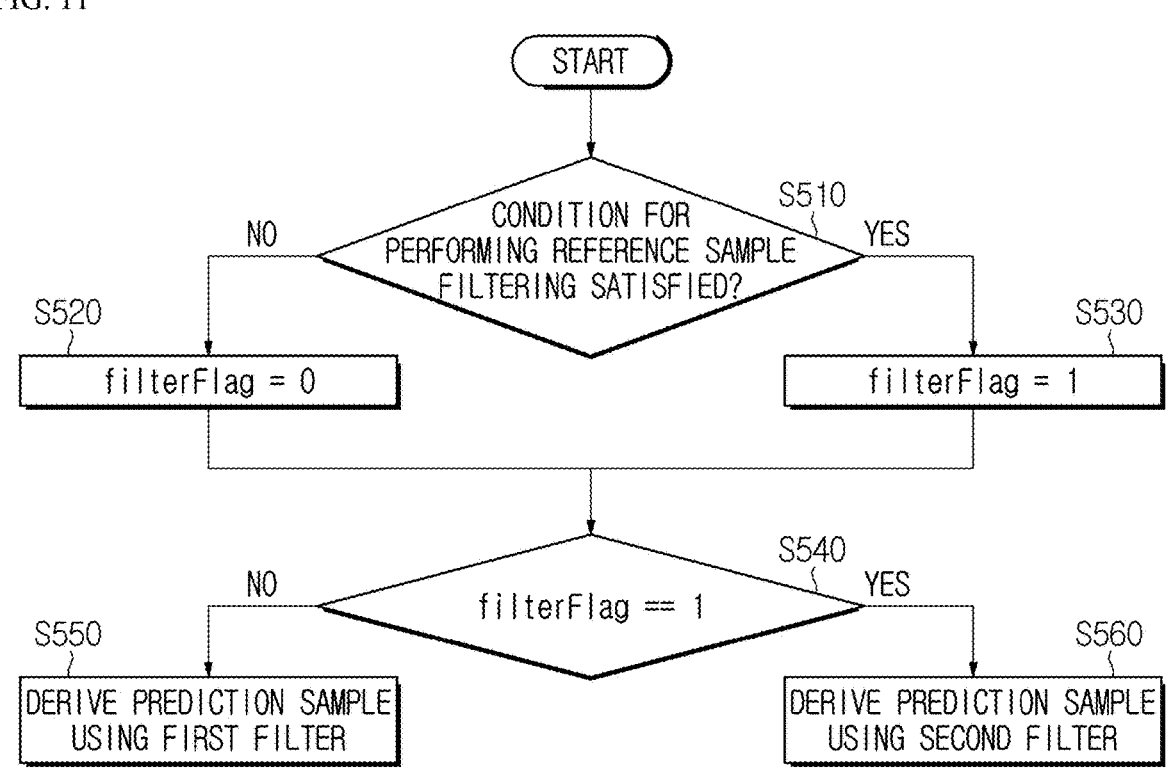
FIGS. 11 to 12 are views illustrating another example of FIG. 10.

In an embodiment, specific values of the first value and the second value of filterFlag may be set as necessary. FIG. 11 is a flowchart illustrating operation of a decoding apparatus when a first value is set to 0 and a second value is set to 1 in the embodiment of FIG. 10. In addition to setting of the first value and the second value, steps corresponding to reference numerals S510 to S560 of FIG. 11 may correspond to steps corresponding to reference numerals S410 to S460 of FIG. 10. Meanwhile, in another embodiment, a first value indicating that reference sample filtering is not performed may be set to 1 and a second value indicating that reference sample filtering is performed may be set to 0.

In addition, filterFlag may be set to 1 when the intra prediction mode of the current block is a predetermined mode and, otherwise, may be set to 0. The predetermined mode may be a planar mode or a directional mode indicating a reference sample at an integer position. In this case, even though a vertical mode and a horizontal mode indicate a reference sample at an integer position, the filterFlag value may be set to 0. That is, when the intra prediction mode of the current block is one of the above-described predetermined modes, reference sample filtering may be performed. Otherwise, reference sample filtering may not be performed.

Meanwhile, a parameter indicating whether filtering of the intra reference sample of FIG. 10 may be called a name other than filterFlag. An embodiment thereof is shown in FIG.

Figure 12:
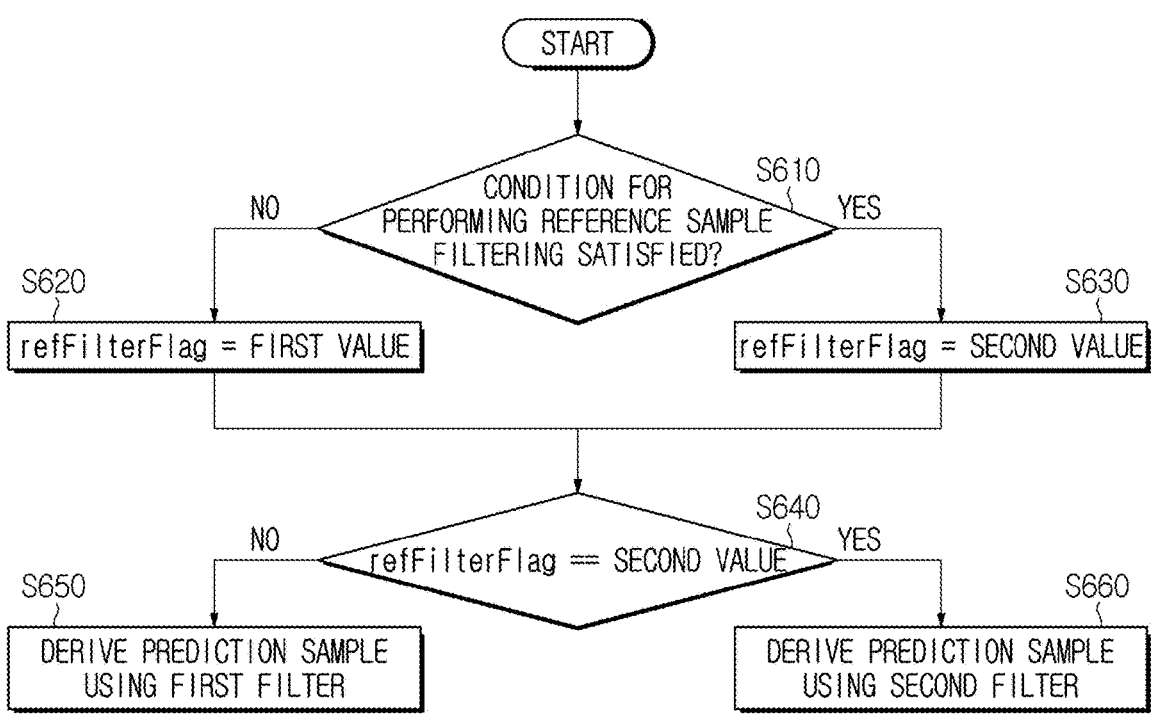

12. As in the example of FIG. 12, filterFlag may be called refFilterFlag. In addition to a change in term, steps corresponding to reference numerals S610 to S660 of FIG. 12 may correspond to steps corresponding to reference numerals S410 to S460 of FIG. 10.

First Embodiment

Hereinafter, reference sample filtering and an intra prediction method according to an embodiment will be described with reference to FIG. 13. It is necessary to provide a configuration for signaling whether to apply filtering in a reference sample filtering step, in order to apply a smoothing filter to a reference sample, to which a smoothing filter is applied, to generate a prediction sample and to apply a sharpening filter to a reference sample, to which a smoothing filter is not applied. Therefore, whether to apply filtering in the reference sample filtering step may be determined in the prediction sample generation step and a filter may be selected to generate a prediction sample, thereby increasing intra prediction efficiency.

Figure 13:
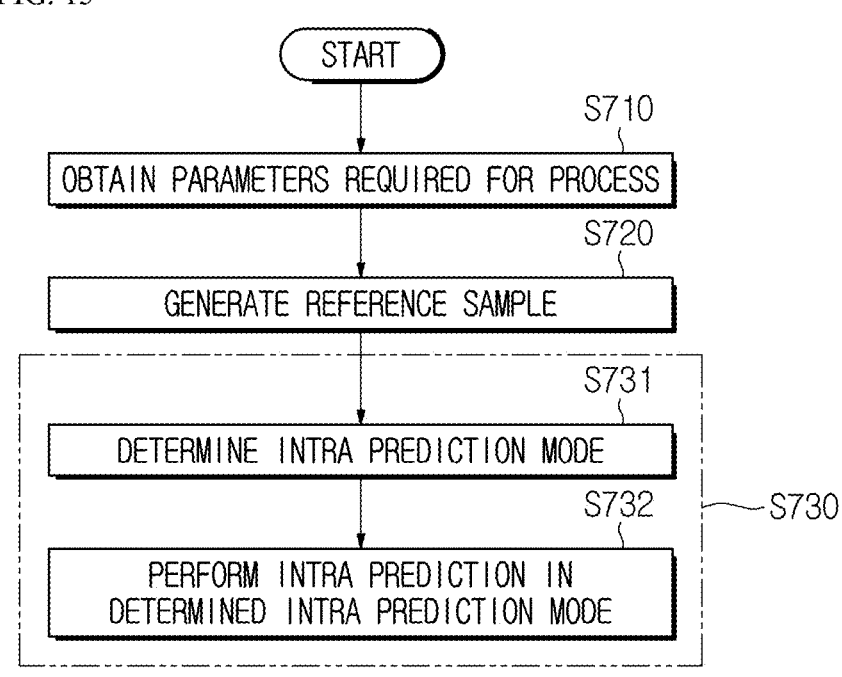
FIG. 13 is a flowchart illustrating a method of generating an intra prediction sample according to a result of performing reference sample filtering by a decoding apparatus according to an embodiment.

FIG. 13 is a flowchart illustrating a method of generating an intra prediction sample according to a result of performing reference sample filtering by a decoding apparatus according to an embodiment. First, the decoding apparatus according to the embodiment may obtain the following parameters by input or derivation (S710). For example, the decoding apparatus may receive the following parameters. Here, x has an integer value from 0 to nTbW−1, and y has an integer from 0 to nTbH−1.

(xTbCmp, yTbCmp) coordinate pair indicating a relative position of a top-left sample of a current transform block for a top-left sample of a current picture predModeIntra which is a parameter indicating an intra prediction mode nTbW which is a parameter indicating a width of a transform block nTbH which is a parameter indicating a height of a transform block nCbW which is a parameter indicating a width of a coding block nCbH which is a parameter indicating a height of a coding block cIdx which is a parameter indicating a color component of a current block Meanwhile, the decoding apparatus according to the embodiment may derive parameters refW and refH as follows in order to generate an intra prediction sample.

In an example, when IntraSubPartitionsSplitType which is a parameter indicating a split type of a current luma coding block indicates non-split (ISP_NO_SPLIT) or cIdx which is a color component of a current block is not 0 (that is, when the current block is not a luma block but is a chroma block), refW and refH may be derived according to the following equations.

$$refW = nTbW * 2 \qquad \text{[Equation 6]}$$

$$refH = nTbH * 2 \qquad \text{[Equation 7]}$$

Meanwhile, unlike the above conditions, when IntraSubPartitionsSplitType indicates split and the value of cIdx indicates a luma block, for example, when IntraSubPartitionsSplitType is ISP_HOR_SPLIT indicating horizontal split or ISP_VER_SPLIT indicating vertical split and the value of cIdx has a value of 0 indicating a luma block, refW and refH may be derived as follows.

$$refW = nCbW * 2 \qquad \text{[Equation 8]}$$

$$refH = nCbH * 2 \qquad \text{[Equation 9]}$$

Furthermore, a parameter refIdx indicating an intra prediction reference line may be derived based on IntraLumaRefLineIdx which is an array for storing an index of a reference line referenced during intra prediction of a luma component with respect to the position of a current transform block as follows.

$$refIdx =$$ [Equation 10]

$$(cIdx == 0)? IntraLumaRefLineIdx[xTbCmp][yTbCmp]: 0$$

Next, the decoding apparatus according to the embodiment generates a reference sample p [x][y] using the above-described parameters (S720). Hereinafter, this will be described in greater detail with reference to FIG. 7 again. Here, the x, y coordinate pair may consist of x=−1−refIdx, y=−1−refIdx to refH−1 and x=−refIdx to refW−1, y=−1−refIdx.

First, the decoding apparatus according to the embodiment may check availability of the reference sample with respect to a sample position (xTbCmp, yTbCmp) (S111). To this end, the decoding apparatus may obtain, as input, refIdx which is a parameter indicating an intra prediction reference line index, refW which is a parameter indicating a width of a reference sample, refH which is a parameter indicating a height of a reference sample, cIdx which is a parameter indicating a color component index. In addition, the decoding apparatus may provide, as output, refUnfilt[x][y] which is a parameter indicating a reference sample. Here, the x, y coordinate pair may consist of x=−1−refIdx, y=−1−refIdx to refH−1 and x=−refIdx to refW−1, y=−1−refIdx.

Next, upon determining that at least one sample of refUnfilt [x][y] of the x, y coordinate pair consisting of x=−1−refIdx, y=−1−refIdx to refH−1 and x=−refIdx to refW−1, y=−1−refIdx is not available, the decoding apparatus may perform a reference sample substitution step (S112).

The decoding apparatus may obtain, as input, refIdx which is a parameter indicating an intra prediction reference line index, refW which is a parameter indicating a width of a reference sample, refH which is a parameter indicating a height of a reference sample, cIdx which is a parameter indicating a color component index and refUnfilt[x][y] which is a parameter indicating a reference sample (where, the x, y coordinates consist of x=−1−refIdx, y=−1−refIdx to refH−1 and x=−refIdx to refW−1, y=−1−refIdx), in order to perform a reference sample substitution step. In addition, the decoding apparatus may generate refUnfilt[x][y] which is a parameter indicating a reference sample (where, the x, y coordinate pair consists of x=−1−refIdx, y=−1−refdx to refH−1 and x=−refIdx to refW−1, y=−1−refIdx) modified as a result of the reference sample substitution step.

Next, the decoding apparatus may perform a reference sample filtering step (S113). The decoding apparatus may obtain, as input, refIdx indicating an intra prediction reference line index, nTbW which is a parameter indicating a width of a transform block, nTbH which is a parameter indicating a height of a transform block, refW which is a parameter indicating a width of a reference sample, refH which is a parameter indicating a height of a reference sample, refUnfilt[x][y] which is a parameter indicating a sample which is not filtered with respect to x=−1−refIdx, y=−1−refIdx to refH−1 and x=−refIdx to refW−1, y=−1−refIdx and cIdx which is a parameter indicating a color component index. In addition, the decoding apparatus may generate filterFlag which is a parameter indicating whether reference sample filter is performed as a result of reference sample filtering step and p[x][y] which is a parameter indicating a reference sample. Here, x=−1−refIdx, y=−1−refIdx to refH−1 and x=−refIdx to refW−1, y=−1−refIdx.

It will be described again with reference to FIG. 13. In a next step, the decoding apparatus according to the embodiment generates an intra prediction sample (S730). The decoding apparatus according to the embodiment may determine an intra prediction mode to be applied to the current block according to the value of predModeIntra (S731). In addition, the decoding apparatus may generate an intra prediction sample by performing intra prediction in the determined intra prediction mode (S732).

For example, when the value of predModeIntra indicates an intra planar prediction mode (INTRA_PLANAR), the decoding apparatus according to the embodiment may generate a prediction sample of the corresponding block in an intra planar prediction mode. In this case, the decoding apparatus may obtain, as input, nTbW which is a parameter indicating a width of a transform block, nTbH which is a parameter indicating a height of a transform block and p which is a parameter indicating a reference sample array. The decoding apparatus may generate, as a result, predSamples which is a parameter indicating a prediction sample array.

Meanwhile, when predModeIntra is not the same as above and predModeIntra indicates an intra DC prediction mode (INTRA_DC), the decoding apparatus may generate a prediction sample of the corresponding block in an intra DC prediction mode. In this case, the decoding apparatus may obtain, as input, nTbW which is a parameter indicating a width of a transform block, nTbH which is a parameter indicating a height of a transform block and p which is a parameter indicating a reference sample array. The decoding apparatus may generate, as a result, predSamples which is a parameter indicating a prediction sample array.

Meanwhile, when predModeIntra is not the same as above and predModeIntra is a value indicating a Cross-Component Linear Model (CCLM) mode for a chroma sample such as INTRA_LT_CCLM, INTRA_L_CCLM or INTRA_T_C-CLM described above, the decoding apparatus may perform an intra prediction mode process corresponding thereto. In this case, the decoding apparatus may obtain, as input, predModeIntra which is a parameter indicating an intra prediction mode, a sample position (xTbC, yTbC) set to be equal to (xTbCmp, yTbCmp), nTbW which is a parameter indicating a width of a transform block, nTbH which is a parameter indicating a height of a transform block and p which is a parameter indicating a reference sample array. The decoding apparatus may generate, as output, pred-Samples which is a parameter indicating a prediction sample array.

Meanwhile, when predModeIntra is not the same as above, the decoding apparatus may perform a directional intra prediction mode. The decoding apparatus may obtain, as input, predModeIntra which is a parameter indicating an intra prediction mode, refIdx which is a parameter indicating an intra prediction reference line index, nTbW which is a parameter indicating a width of a transform block, nTbH which is a parameter indicating a height of a transform block, refW which is a parameter indicating a width of a reference sample, refH which is a parameter indicating a height of a reference sample, nCbW indicating a width of a coding block, nCbH which is a parameter indicating a height of a coding block, cIdx which is a parameter indicating a color component index, filterFlag which is a parameter indicating whether reference sample filtering is performed, and p which is a parameter indicating a reference sample array. The decoding apparatus may generate predModeIntra which is a parameter indicating an intra prediction mode modified as a result of performing this and predSamples which is a parameter indicating a prediction sample array.

Figure 14:
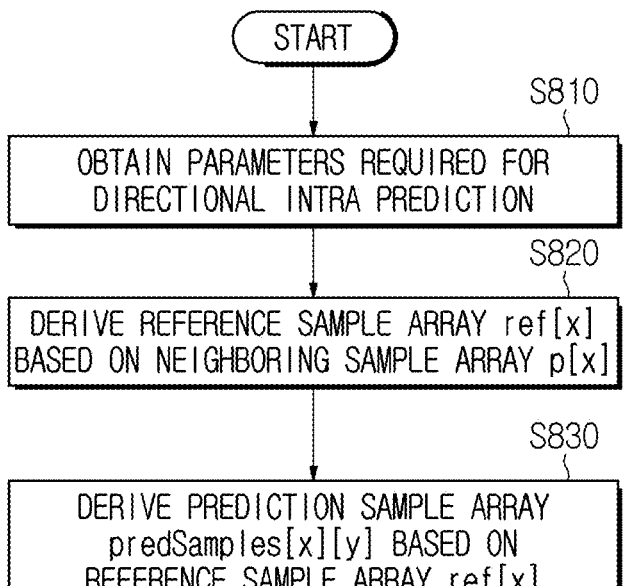
FIG. 14 is a flowchart illustrating a method of performing a directional intra prediction mode by a decoding apparatus according to an embodiment.

Hereinafter, a method of performing a directional intra prediction mode by the decoding apparatus according to the embodiment will be described with reference to FIG. 14. FIG. 14 is a flowchart illustrating a method of performing a directional intra prediction mode by a decoding apparatus according to an embodiment. The decoding apparatus according to the embodiment may generate an intra prediction mode predModeIntra modified as a result of performing $2^{nd}$ to $66^{th}$ directional intra prediction modes (INTRA_ANGULAR2 to INTRA_ANGULAR66) and a predicted sample predSamples[x][y]. Here, x=0 to nTbW−1, and y=0 to nTbH−1.

First, the decoding apparatus according to the embodiment obtains parameters required to perform the directional intra prediction mode (S810). For example, the decoding apparatus according to the embodiment may obtain, as input, the following parameters to perform the directional intra prediction mode.

predModeIntra which is a parameter indicating an intra prediction mode refIdx which is a parameter indicating an intra prediction reference line index nTbW which is a parameter indicating a width of a transform block nTbH which is a parameter indicating a height of a transform block refW which is a parameter indicating a width of a reference sample refH which is a parameter indicating a height of a reference sample nCbW which is a parameter indicating a width of a coding block nCbH which is a parameter indicating a height of a coding block cIdx which is a parameter indicating a color component of a current block filterFlag which is a parameter indicating reference sample filtering neighboring sample p[x][y] (here, the x, y pair consists of x=−1−refIdx, y=−1−refIdx to refH−1 and x=−refIdx to refW−1, y=−1−refIdx)

Here, the neighboring sample p[x][y] may be a reference sample array p[x][y] generated by performing the reference sample generation step S720 described above with reference to FIG. 13.

Meanwhile, nTbS which is a parameter indicating a horizontal sample size of a transform block may be determined as (Log 2 (nTbW)+Log 2 (nTbH))>>1.

In addition, the decoding apparatus may derive a parameter nW indicating a width of a current block and a parameter nH indicating a height of a current block. In an embodiment, the decoding apparatus may derive nW and nH based on the values of IntraSubPartitionsSplitType and cIdx. The decoding apparatus may derive nW and nH as follows, when IntraSubPartitionsSplitType is ISP_NO_SPLIT or cIdx is not 0.

$$nW = nTbW \qquad \text{[Equation 11]}$$

$$nH = nTbH \qquad \text{[Equation 12]}$$

Meanwhile, when the values of IntraSubPartitionsSplitType and cIdx are not the same as above (e.g., IntraSubPartitionsSplitType is not equal to ISP_NO_SPLIT and cIdx is equal to 0), the decoding apparatus may derive nW and nH as follows.

$$nW = nCbW \qquad \text{[Equation 13]}$$

$$nH = nCbH \qquad \text{[Equation 14]}$$

In addition, the decoding apparatus may set whRatio which is a parameter indicating an aspect ratio (a ratio of a width to a height) of the current block using nW and nH according to the Abs(Log 2(nW/nH)) calculation result. Furthermore, the decoding apparatus may determine wideAngle, which is a parameter indicating whether it is a wide angle, as 0.

Meanwhile, in the case of a non-square block (for example, nW is not equal to nH), the decoding apparatus may modify predModeIntra which is a parameter indicating an intra prediction mode. For example, the decoding apparatus may set wideAngle to 1 and modify predModeIntra to a value of (predModeIntra+65) when all of the following conditions are true.

(Condition 1) nW is greater than nH.

(Condition 2) predModeIntra is greater than or equal to 2.

(Condition 3) predModeIntra is less than a value calculated by (whRatio>1)?(8+2*whRatio):8.

However, if all of the above conditions are true, the decoding apparatus may set wideAngle to 1 and modify predModeIntra to a value of (predModeIntra−67) when all of the following conditions are true.

(Condition 1) nH is greater than nW.

(Condition 2) predModeIntra has a value of 66 or less.

(Condition 3) predModeIntra has a value greater than a value calculated by (whRatio>1)?(60−2*whRatio):60.

Figures 15, 16:
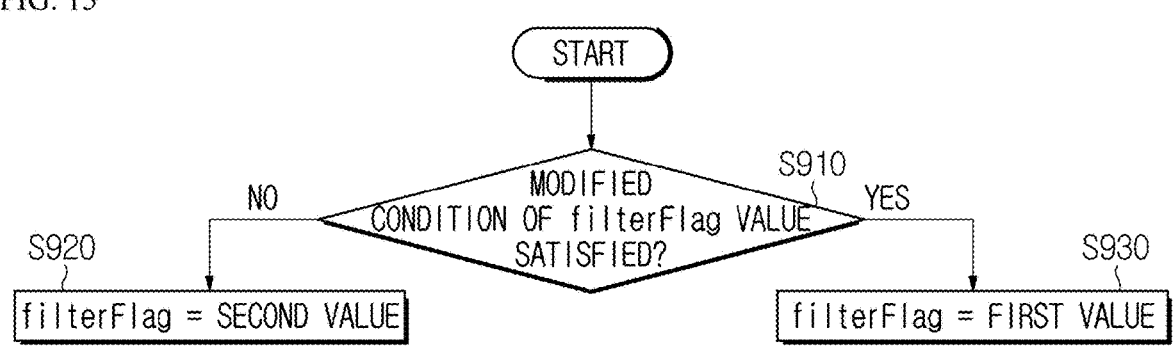
FIG. 15 is a flowchart illustrating a method of deriving a modified filterFlag value by a decoding apparatus according to an embodiment.
FIG. 16 is a mapping table between predModeIntra and intraPredAngle which is a parameter indicating an angle according to an embodiment.

In addition, the decoding apparatus may derive the modified filterFlag. FIG. 15 is a flowchart illustrating a method of deriving a modified filterFlag value by a decoding apparatus. In an embodiment, the decoding apparatus may determine whether at least one of the following conditions is true (S910). When at least one of the following conditions is true, the decoding apparatus may set the value of the modified filterFlag to a first value (S930). In an embodiment, the first value may be 0.

(Condition 1) IntraSubPartitionsSplitType is not equal to ISP_NO_SPLIT, cIdx is 0, predModeIntra is greater than or equal to INTRA_ANGULAR34, and nW is greater than 8.

(Condition 2) IntraSubPartitionsSplitType is not equal to ISP_NO_SPLIT, cIdx is 0, predModeIntra is less than INTRA_ANGULAR34, and nH is greater than 8.

Meanwhile, when the above conditions are not satisfied, the decoding apparatus may set the value of the modified filterFlag to a second value (S920). In an embodiment, the second value may be calculated as 1−filterFlag. For example, when the value of filterFlag is 0, the value of the modified filterFlag may be determined as 1, and, when the value of filterFlag is 1, the value of the modified filterFlag may be determined as 0.

FIG. 16 is a mapping table between predModeIntra and intraPredAngle which is a parameter indicating an angle. The decoding apparatus may derive invAngle which is a parameter indicating an inverse angle as follows based on intraPredAngle of the mapping table of FIG. 16.

$$invAngle = \text{Round}\big((256*32)/\text{"}intraPredAngle\text{"}\big) \qquad \text{[Equation 15]}$$

Here, the Round function means a rounding operation for representing an integer.

FIG. 17 is a table illustrating coefficients of a cubic filter (fC) and a Gaussian filter (fG) as an interpolation filter used for intra prediction. When a phase is from 0 to 31 and j has a value of 0 to 3, an embodiment of fC[phase][j] and fG[phase][j] which are the coefficients of the cubic filter (fC) and a Gaussian filter (fG) is shown in FIG. 17.

Figure 18:
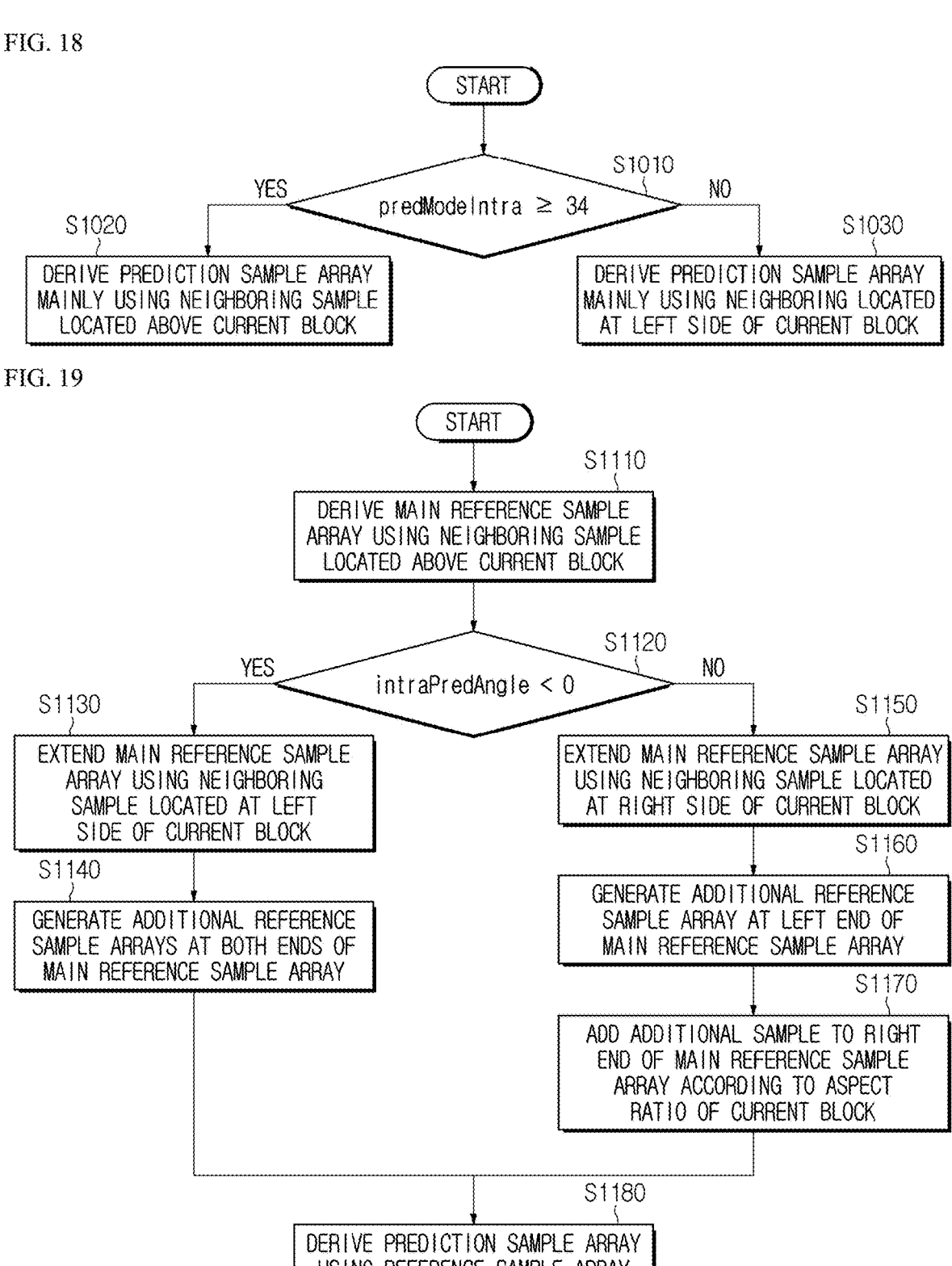
Figure 20:
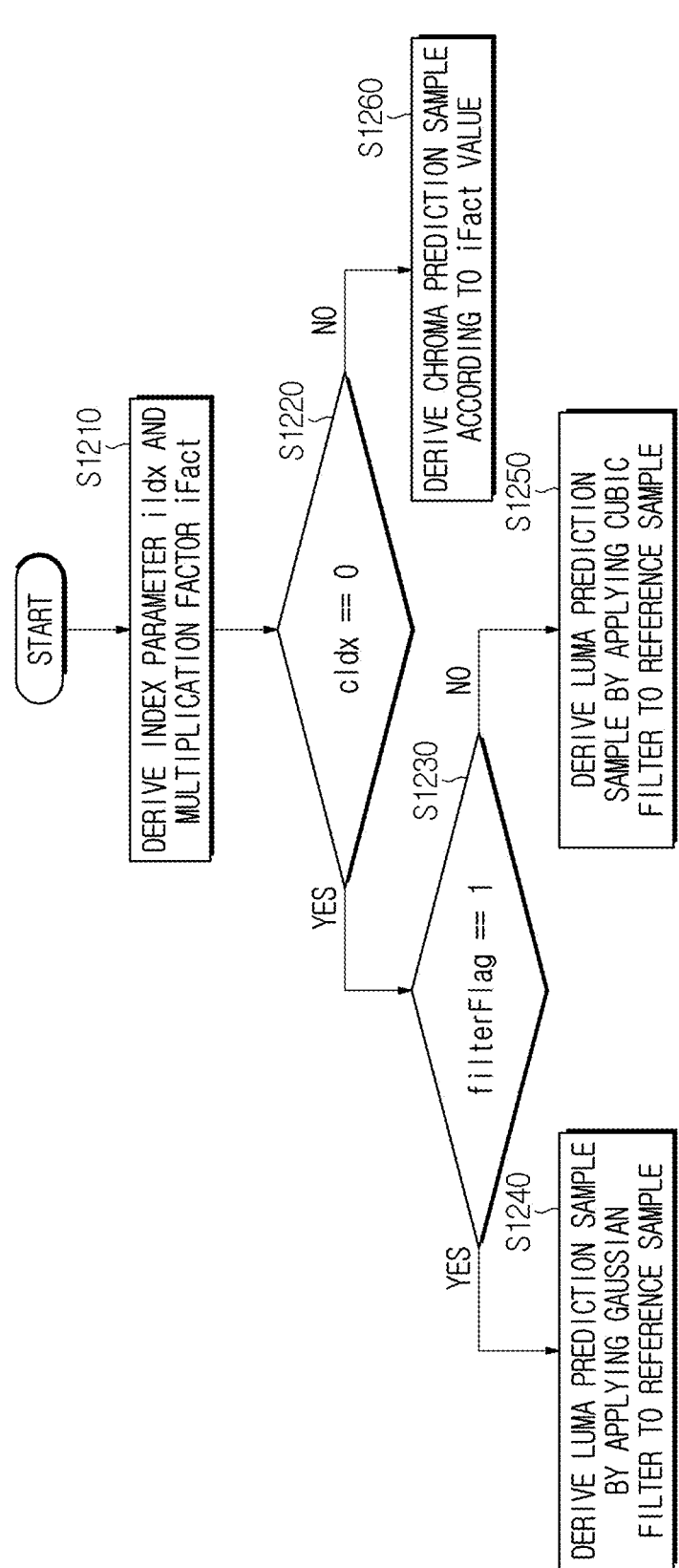

Next, the decoding apparatus may derive a reference sample array ref[x] based on a neighboring sample array p[x] (S820), and derive a prediction sample array predSamples[x][y] (S830). Hereinafter, it will be described with reference to FIGS. 5 and 16 to 20. FIGS. 18 to 20 are flowcharts illustrating a method of deriving a reference sample array ref[x] by a decoding apparatus according to an embodiment.

First, as shown in FIG. 18, the decoding apparatus according to the embodiment may determine a reference sample referenced to derive a prediction sample array predSample [x][y] of a current block according to the value of predModeIntra (S1010). When the value of predModeIntra is greater than or equal to 34, the decoding apparatus may derive predSample[x][y] mainly using neighboring samples located above the current block among the neighboring samples p[x][y] (S1020). When the value of predModeIntra is less than 34, the decoding apparatus may derive predSample[x] [y] mainly using samples located at the left side of the current block among the neighboring samples p[x][y] (S1030).

Step S1020 of constructing predSample[x][y] mainly using the neighboring samples located above the current block by the decoding apparatus will be described in greater detail with reference to FIG. 19. The decoding apparatus may derive a reference sample array ref[x]. ref[x] may be constructed by adding an additional sample after generating a main reference sample array. First, ref[x] may consist of a main reference sample array which is a set of samples referenced as a main value to derive the sample value of the current block. For example, when the Gaussian or cubic filter described below is applied to the reference sample array to derive the value of each sample of the current block, a reference sample to which a highest filter coefficient is applied may be a reference sample referenced as a main value. In this example, a main reference sample array may be constructed by a set of reference samples consisting of samples to which a highest filter coefficient is applied. More specifically, in the example of the table for the filter coefficient of FIG. 17, when a phasee p is 0, a fG interpolation filter coefficient has a highest value in fG[0][1], and a reference sample corresponding thereto may be determined as a main reference sample. In order to construct such a main reference sample array, a main reference sample array may be constructed by values of neighboring samples specified in the intra prediction direction of the current block.

The decoding apparatus may derive a main reference sample array ref[x] using the neighboring samples located above the current block in order to derive a reference sample array ref[x] (S1110). The following equation may be used to perform this step.

$$ref[x] = p[-1 - refIdx + x] - 1 - refIdx], \qquad \text{[Equation 16]}$$

where, x may have a value from 0 to nTbW+refIdx.

Figure 21:
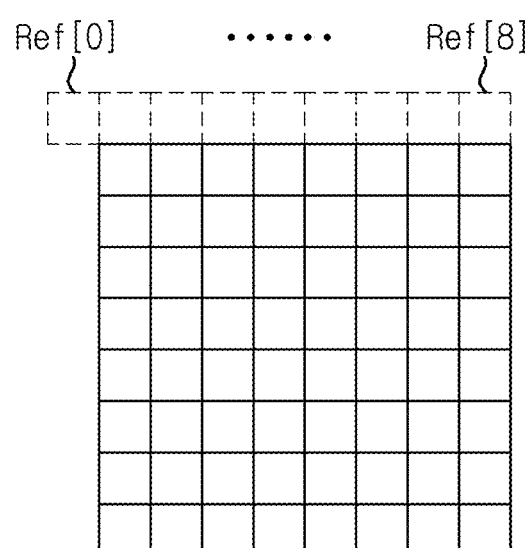
FIGS. 21 to 26 are views illustrating examples of a reference sample array used to generate a prediction sample of a current block.

When predModeIntra is 34, nTbW is 8 and refIdx is 0, a correspondence relationship between ref[0] to ref[8] generated according to Equation 16 and neighboring blocks is shown in FIG. 21.

Figure 22:
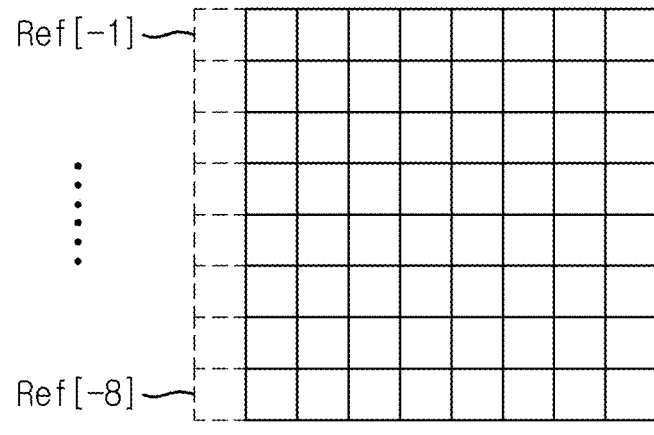

Next, the decoding apparatus determines neighboring blocks referenced to extend the main reference sample array according to the value of intraPredAngle derived according to FIG. 16 (S1120). When the value of intrapredAngle is less than 0, the decoding apparatus may extend the main reference sample array using the neighboring samples located at the left side of the current block (S1130). For example, when the calculation result of (nTbH*intraPredAngle)>>5 is less than −1, the decoding apparatus may extend the main reference sample array from the value of the left neighboring block using Equation 17 below.

$$ref[x] = \qquad\qquad\qquad \text{[Equation 17]}$$
$$p[-1 - refIdx][-1 - refIdx + ((x * invAngle + 128) >> 8)],$$

where, x may have a value of −1 to (nTbH* intraPredAngle)>>5. When predModeIntra is 34, nTbW is 8, nTbH is 8 and refIdx is 0, a correspondence relationship between ref[−1] to ref[−8] generated according to Equation 17 and the neighboring blocks is shown in FIG. 22.

Next, the decoding apparatus may add additional samples to both ends of the main reference sample array (S1140). As described below, in the case where a 4-tap filter is applied to derive the sample value of the current block, when reference samples at both ends of the main reference sample may be selected as the main reference sample and a filter is applied to the reference samples, the value of the reference sample to be input to the filter may not be present.

For example, when a Gaussian filter (fG) having 0 as a phase (p) value in FIG. 17 is applied using ref[8] of FIG. 21 as the main reference sample, the value of the reference sample corresponding to fG[0][2] and fG[0][3] is not present in ref[ ]. In this example, since the coefficient value of fG[0][3] is 0, the value of the reference value corresponding to the corresponding position may not be specified. However, since the coefficient of fG[0][2] is present, the sample value for fG[0][2] needs to be stored in ref[ ].

In order to eliminate this problem, additional samples may be added to ends of the main reference sample array. The additional sample may be set to the value of the reference sample having an index closest to the index of the additional sample based on the index of the main reference sample array. To this end, the decoding apparatus may copy the value of the reference sample having an index closest to the additional sample from ref[ ] or obtain it from the value of the neighboring blocks corresponding thereto and store it in ref[ ].

Equations 18 and 19 below represent calculation of the decoding apparatus for adding the additional samples to both ends of the main reference sample array using the pre-calculated main reference sample array. The decoding apparatus may add the additional samples to the reference sample array using the following equations.

$$ref[((nTbH * intraPredAngle) >> 5) - 1] = \qquad \text{[Equation 18]}$$
$$ref[(nTbH * intraPredAngle) >> 5]$$

-continued $$ref[nTbW + 1 + refIdx] = ref[nTbW + refIdx] \qquad \text{[Equation 19]}$$

Figure 23:
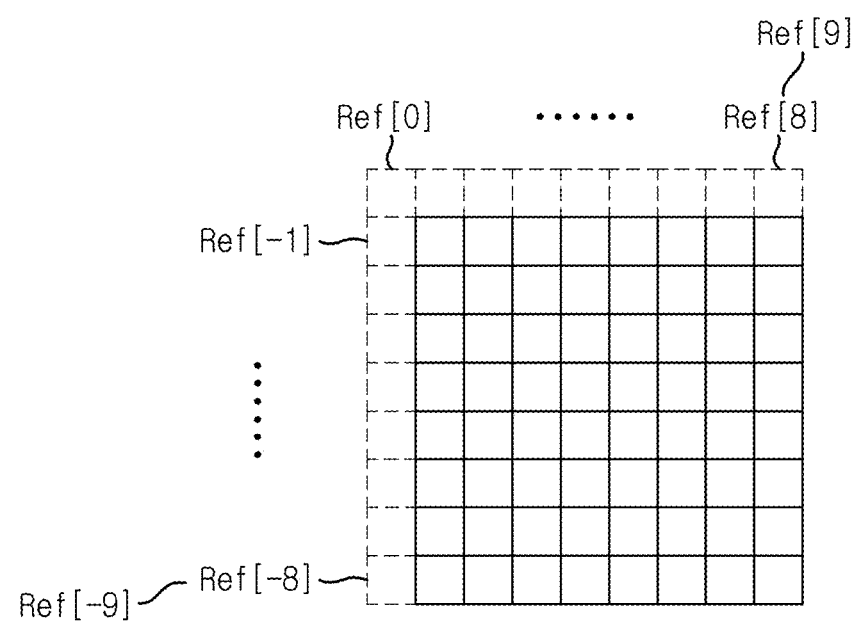

When predModeIntra is 34, nTbW is 8 and refIdx is 0, a correspondence relationship between ref[−9] and ref[9] generated according to Equation 18 and the neighboring blocks is shown in FIG. 23.

Meanwhile, when intraPredAngle is not less than 0, the decoding apparatus may extend the main reference sample array using the neighboring samples located on the top-right side of the current block (S1150). The decoding apparatus may extend the main reference sample array from the value of the neighboring block at the top-right side using Equation 20 below.

$$ref[x] = p[-1 - refIdx + x][-1 - refIdx], \qquad \text{[Equation 20]}$$

$$\text{where, } x = nTbW + 1 + refIdx \text{ to refW} + refIdx.$$

Figure 24:
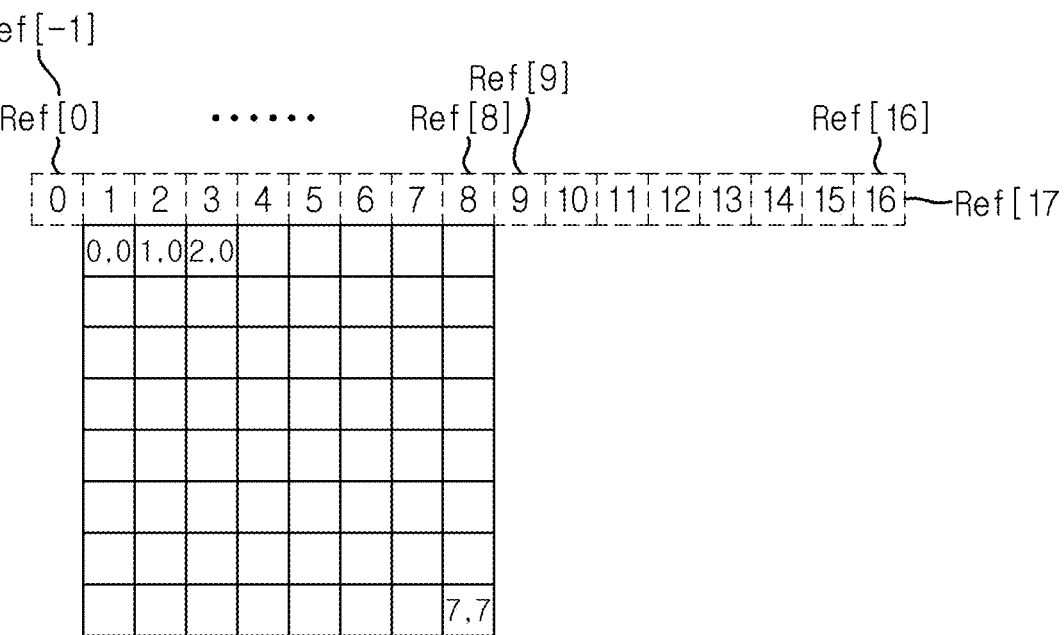

When predModeIntra is 66, nTbW is 8, nTbH is 8, refW is 16 and refIdx is 0, a correspondence relationship between ref[9] to ref[16] generated according to Equation 20 and the neighboring blocks is shown in FIG. 24.

Next, the decoding apparatus may add the additional sample to the left end of the main reference sample array (S1160). In an embodiment, the decoding apparatus may determine the sample value of ref[−1] using the sample value of ref[0] using Equation 21 below.

$$ref[-1] = ref[0] \qquad \text{[Equation 21]}$$

Next, the decoding apparatus adds the additional sample to the right end of the main reference sample array (S1170). The decoding apparatus may add the additional sample to the right end of the main reference sample array according to an aspect ratio whRatio of the current block. In an embodiment, the decoding apparatus may derive ref[refW+refIdx+x] which is a parameter indicating an additional sample using Equation 22 below. Here, x is 1 to (Max(1, nTbW/nTbH)*refIdx+1).

$$ref[refW + refIdx + x] = p[-1 + refW][-1 - refIdx] \qquad \text{[Equation 22]}$$

In an embodiment in which predModeIntra is 66, nTbW is 8, nTbH is 8, refW is 16 and refIdx is 0, a correspondence relationship between the additional samples ref[−1] and ref[17] generated according to Equation 21 and 22 and the neighboring blocks is shown in FIG. 24.

Next, the decoding apparatus may derive a prediction sample array using the generated reference sample array (S1180). This step will be described with reference to FIG. 20. For example, the decoding apparatus may derive a prediction sample predSamples[x][y] having values of x=0 to nTbW−1 and y=0 to nTbH−1 as follows. First, the decoding apparatus may derive iIdx which is an index parameter for deriving the prediction sample and a multiplication factor iFact as follows (S1210).

$$iIdx = ((y + 1 + refIdx) * intraPredAngle) \gg 5 + refIdx \qquad \text{[Equation 23]}$$

-continued $$iFact = ((y + 1 + refIdx) * intraPredAngle) \,\&\, 31 \qquad \text{[Equation 24]}$$

Next, the decoding apparatus determines whether the current block is a luma block according to the value of cIdx (S1220). In this case, when cIdx is 0, the decoding apparatus selects an interpolation filter for deriving a luma prediction sample according to the value of filterFlag (S1230). The decoding apparatus may derive an interpolation filter coefficient fT[j] with j=0 to 3 as follows.

$$fT[j] = \text{filterFlag ? } fG[iFact][j]:fC[iFact][j] \qquad \text{[Equation 25]}$$

More specifically, the decoding apparatus may select Gaussian filter (fG) coefficients for the phase (p) value selected as the iFact value when the value of filterFlag is equal to 1. In this case, the decoding apparatus may derive the luma prediction sample of the current block by applying the Gaussian filter to the reference sample using the selected filter coefficient value (S1240)

Meanwhile, the decoding apparatus may select cubic filter (fC) coefficients for the phase (p) value selected as the iFact value when the value of filterFlag is not equal to 1. In this case, the decoding apparatus may derive the luma prediction sample of the current block by applying the cubic filter to the reference sample using the selected filter coefficient value (S1250).

In an embodiment, the value of the prediction sample predSamples[x][y] may be derived as follows using the selected filter coefficient fT[i].

$$predSamples[x][y] =  \qquad \text{[Equation 26]}$$
$$Clip1Y\left(\left(\left(\sum\nolimits_{i=0}^{3} fT[i] * ref[x + iIdx + i]\right) + 32\right) \gg 6\right)$$

In an embodiment, predModeIntra may be 66, nTbW may be 8, nTbH may be 8, refW may be 16, refIdx may be 0, and cIdx may be set to 0. In this embodiment, according to Equations 23 and 24 above, the value of iIdx for predSamples[0][0] may be set to 1, the value of iFact may be set to 0, the value of iIdx for predSamples[7][7] may be set to 8, and the value of iFact may be set to 0. In addition, when filterFlag has a value of 1, fT[j] may be set to a filter coefficient according to a Gaussian filter and may be set to fT[ ]=(16, 32, 16, 0).

Figure 25:
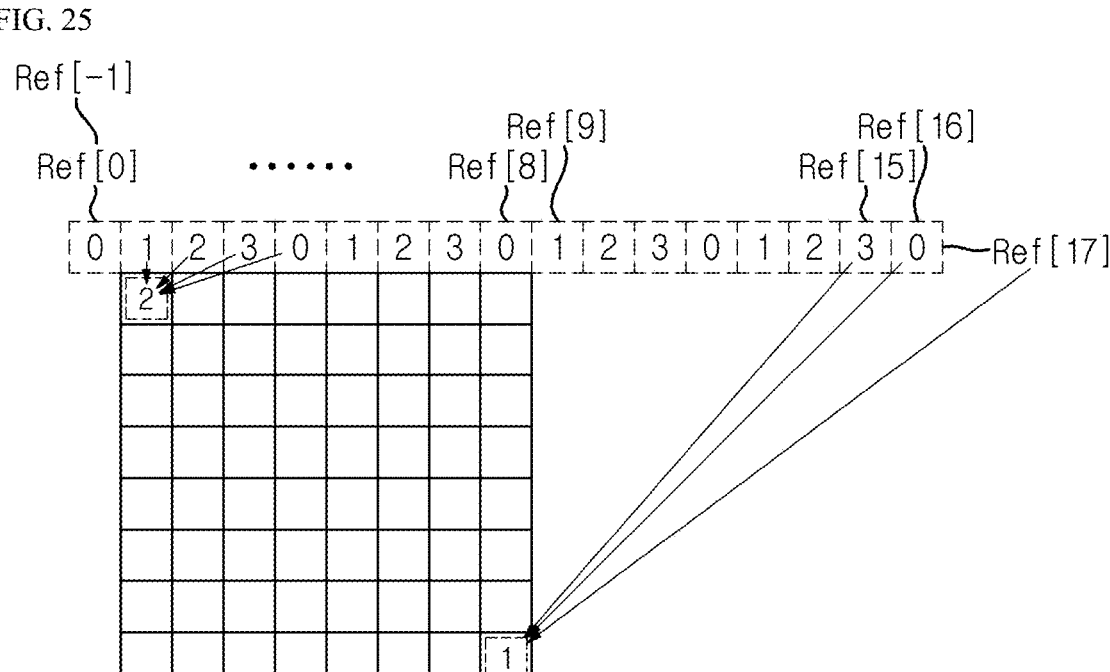

FIG. 25 shows the result of deriving predSamples[0][0] and predSamples[7][7] in this embodiment. predSamples[0][0] may be derived according to the calculation result of ((ref[1]*16+ref[2]*32+ref[3]*16+ref[4]*0)+32)>>6. In this example, the value of predSamples[0][0] may be calculated as 2.

predSamples[7][7] may be derived according to the calculation result of ((ref[15]*16+ref[16]*32+ref[17]*16+ref[18]*0)+32)>>6. In this example, the value of predSamples[7][7] may be calculated as 1. In an example of calculating predSamples[7][7], the value of ref[18] is not defined, but the value of the Gaussian filter coefficient fT[3] multiplied by ref[18] is 0. Therefore, the above calculation is possible.

Meanwhile, in this embodiment, when filterFlag has a value of 0, fT[j] may be set to a filter coefficient according to a cubic filter and may be set to fT[ ]=(0, 64, 0, 0).

Figures 26, 27, 28:
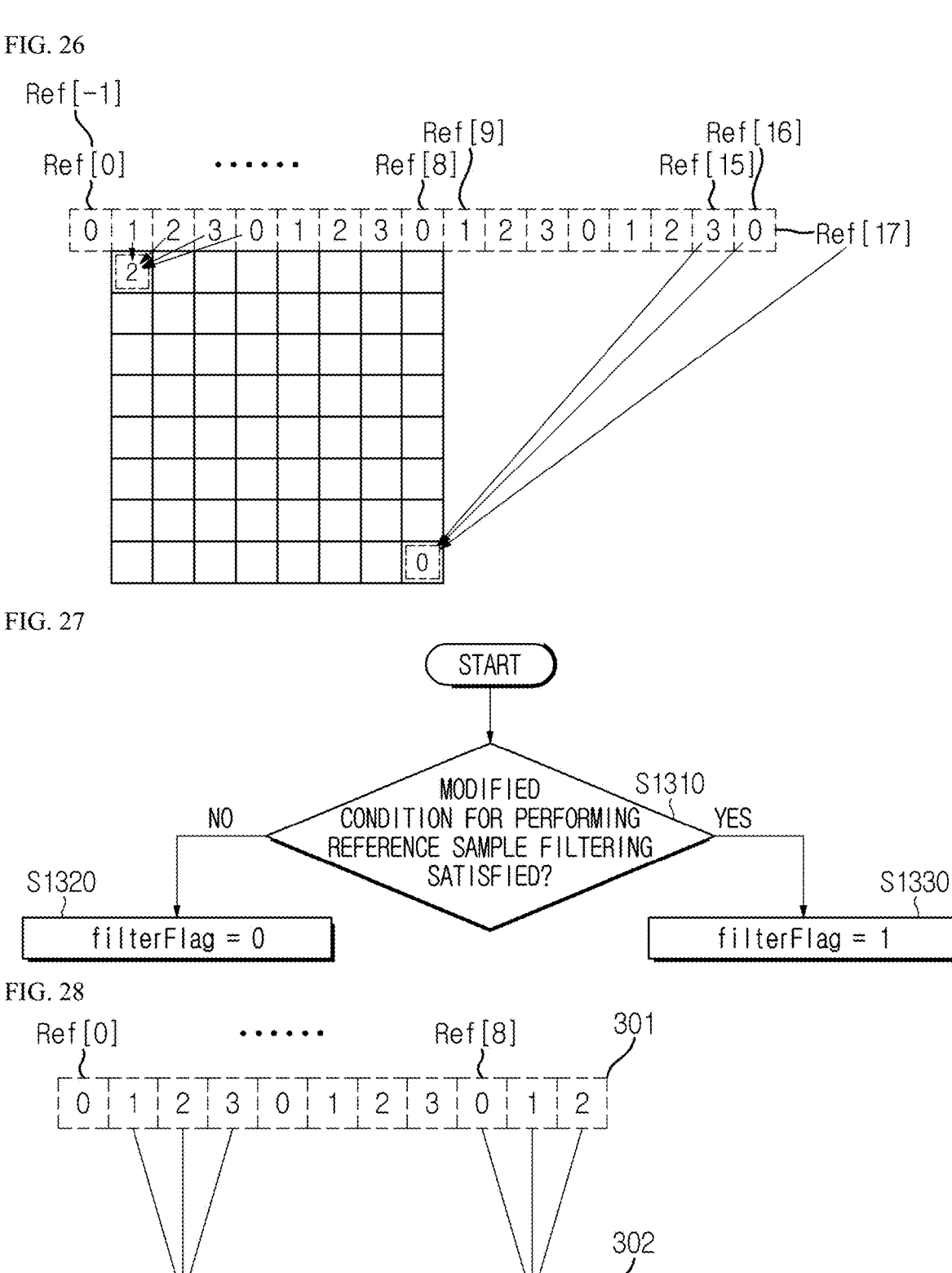
FIG. 27 is a flowchart illustrating a procedure of determining a condition for performing reference sample filtering by a decoding apparatus according to an embodiment.
FIG. 28 is a view illustrating an example of a target sample array to which a [1 2 1]/4 filter will be applied and a result sample array to which the [1 2 1]/4 filter is applied.

FIG. 26 shows a result of deriving predSamples[0][0] and predSamples[7][7] in this embodiment. predSamples[0][0] may be derived according to the result of calculating ((ref [1]*0+ref[2]*64+ref[3]*0+ref[4]*0)+32)>>6. In this example, the value of predSamples[0][0] may be calculated as 2.

predSamples[7][7] may be derived according to the result of calculating ((ref[15]*0+ref[16]*64+ref[17]*0+ref[18] *0)+32)>>6. In this example, the value of predSamples[7] [7] may be calculated as 0. In an example of calculating predSamples[7][7], the value of ref[18] is not defined, but the value of the cubic filter coefficient fT[3] multiplied by ref[18] is 0. Therefore, the above calculation is possible.

Meanwhile, when cIdx is not 0, the value of a chroma prediction sample may be determined according to the value of iFact (S1260). In an embodiment, when iFact is not 0, the value of the chroma prediction sample predSamples[x][y] may be derived as follows.

$$predSamples[x][y] = ((32 - iFact) * ref[x + iIdx + 1] + \qquad \text{[Equation 27]}$$
$$iFact * ref[x + iIdx + 2] + 16) \gg 5$$

Meanwhile, when iFact is 0, the value of the chroma prediction sample predSamples[x][y] may be derived as follows.

$$predSamples[x][y] = ref[x + iIdx + 1] \qquad \text{[Equation 28]}$$

Referring to FIG. 18 again, when predModeIntra is less than 34, the decoding apparatus according to the embodiment may derive a prediction sample array predSample[x] [y] mainly using the neighboring sample located at the left side of the current block (S1030). This step corresponds to step S1030 described above and thus a difference from step S1020 will be focused upon. First, the decoding apparatus may set the main reference sample array ref[x] as follows.

$$ref[x] = p[-1 - refIdx][-1 - refIdx + x], \qquad \text{[Equation 29]}$$

where, x has a value of 0 to nTbH+refIdx.

In this case, when intraPredAngle is less than 0, the main reference sample array may extend. For example, when the calculation result of (nTbW*intraPredAngle)>>5 is less than −1, ref[x] may extend as follows.

$$ref[x] = \qquad \text{[Equation 30]}$$
$$p[-1 - refIdx + ((x * invAngle + 128) \gg 8)][-1 - refIdx],$$

where, x has a value of −1 to (nTbW*intraPredAngle) >>5.

$$ref[((nTbW * intraPredAngle) \gg 5) - 1] = \qquad \text{[Equation 31]}$$
$$ref[(nTbW * intraPredAngle) \gg 5]$$

$$ref[nTbG + 1 + refIdx] = ref[nTbH + refIdx] \qquad \text{[Equation 32]}$$

Meanwhile, when intraPredAngle is not less than 0, ref[x] may be determined as follows.

$$ref[x] = p[-1 - refIdx][-1 - refIdx + x], \qquad \text{[Equation 33]}$$

where, x has a value of nTbH+1+refIdx to refH+refIdx.

$$ref[-1] = ref[0] \qquad \text{[Equation 34]}$$
$$ref[refH + refIdx + x]$$

which is a parameter indicating an additional sample may be derived as follows. Here, x has a value of 1 to (Max(1, nTbW/nTbH)*refIdx+1).

$$ref[refH + refIdx + x] = p[-1 + refH][-1 - refIdx] \qquad \text{[Equation 35]}$$

Next, when x has a value of 0 to nTbW−1 and y has a value of 0 to nTbH−1, the decoding apparatus may derive a prediction sample predSamples[x][y] as follows. First, iIdx which is an index parameter for deriving the prediction sample and a multiplication factor iFact may be derived as follows.

$$iIdx = ((x + 1 + refIdx) * intraPredAngle) \gg 5 \qquad \text{[Equation 36]}$$
$$iFact = ((x + 1 + refIdx) * intraPredAngle) \& 31 \qquad \text{[Equation 37]}$$

In addition, when cIdx is 0, an interpolation filter coefficient fT[j] with j=0 to 3 may be derived as follows.

$$fT[j] = filterFlag \ ? \ fG[iFact][j] : fC[iFact][j] \qquad \text{[Equation 38]}$$

In addition, the value of the prediction sample predSamples[x][y] may be derived as follows.

$$predSamples[x][y] = \qquad \text{[Equation 39]}$$
$$Clip1Y\left(\left(\left(\sum_{i=0}^{3} fT[i] * ref[y + iIdx + i]\right) + 32\right) \gg 6\right)$$

Meanwhile, when cIdx is not 0, the value of the prediction sample may be determined according to the value of iFact. In an embodiment, when iFact is not 0, the value of the prediction sample predSamples[x][y] may be derived as follows.

$$predSamples[x][y] = ((32 - iFact) * ref[y + iIdx + 1] + \qquad \text{[Equation 40]}$$
$$iFact * ref[y + iIdx + 2] + 16) \gg 5$$

Meanwhile, when iFact is 0, the value of the prediction sample predSamples[x][y] may be derived as follows.

$$preSamples[x][y] = ref[y + iIdx + 1] \qquad \text{[Equation 41]}$$

Meanwhile, when all of the following conditions are true, the decoding apparatus may perform a position-dependent prediction sample filtering step.

(Condition 1) IntraSubPartitionsSplitType is equal to ISP_NO_SPLIT or cIdx is not 0.

(Condition 2) the value of refIdx is 0 or the value of cIdx is not 0.

(Condition 3) predModeIntra indicates the value of any one of INTRA_PLANAR, INTRA_DC, INTRA_ANGULAR18 or INTRA_ANGULAR50 or predModeIntra indicates a value equal to or less than INTRA_ANGULAR10 or a value equal to or greater than INTRA_ANGULAR58.

To this end, the decoding apparatus may obtain, as input, predModeIntra which is a parameter indicating an intra prediction mode, nTbW which is a parameter indicating a width of a transform block, nTbH which is a parameter indicating a height of a transform block, predSamples[x][y] which is a parameter indicating a sample predicted for x=0 to nTbW−1 and y=0 to nTbH−1, refW which is a parameter indicating a width of a reference sample, refH which is a parameter indicating a height of a reference sample, a reference sample p[x][y] with x=−1 and y=−1 to refH−1 and x=0 to refW−1 and y=−1 and cIdx which is a parameter indicating a color component index. In addition, the decodvalue to 1 (S1330). Meanwhile, in order to increase the case where reference sample filtering occurs, the decoding apparatus according to the embodiment may set the filterFlag value to 1 when any one of the following condition is satisfied. In this case, when all of the following conditions are not satisfied, the decoding apparatus may set the filterFlag value to 0.

(Condition 1) The value of refIdx is equal to 0.

(Condition 2) cIdx is equal to 0.

(Condition 3) IntraSubPartitionsSplitType is equal to ISP_NO_SPLIT.

(Condition 4) predModeIntra is not equal to INTRA_DC.

(Condition 5) In addition, one or more of the following conditions 5-1 to 5-4 shall be satisfied.

(Condition 5-1) predModeIntra is equal to INTRA_PLANAR and nTbW*nTbH is greater than 32.

(Condition 5-2) nTbW is greater than nTbH, predModeIntra is equal to or greater than 2, and predModeIntra is less than the calculation result of (whRatio>1)?(8+2*whRatio):8.

(Condition 5-3) nTbH is greater than nTbW, predModeIntra is less than or equal to 66, predModeIntra is greater than the calculation result of (whRatio>1)?(60-2*whRatio):60.

(Condition 5-4) minDistVerHor is greater than intraHorVerDistThres [nTbS]. In this case, a parameter nTbS has a value of (Log 2 (nTbW)+Log 2 (nTbH))>>1, and a parameter minDistVerHor is set to the calculation result of Min(Abs(predModeIntra−50) and Abs(predModeIntra−18)). In this case, a parameter intraHorVerDistThres [nTbS] may be determined with respect to a transform block size nTbS as shown in the following table.

TABLE 2

|  | nTbS = 2 | nTbS = 3 | nTbS = 4 | nTbS = 5 | nTbS = 6 | nTbS = 7 |
|---|---|---|---|---|---|---|
| intraHorVerDistThres[nTbS] | 16 | 14 | 2 | 0 | 0 | 0 | ing apparatus may generate, as output, a prediction sample array predSamples modified as a result of performing this process.

Another Embodiment of Reference Sample Filtering Condition

Meanwhile, for the reference sample filtering step described above with reference to FIG. 8, the decoding apparatus according to the embodiment may perform step S210 using the following modified conditions instead of the conditions described above to determine the filterFlag value. By setting the filtering condition of the reference sample as follows, reference sample filtering may be performed with respect to an intra prediction mode different from the above-described reference sample filtering conditions. For example, when the intra prediction mode of the current bock is an INTRA_DC mode, reference sample filtering may be omitted.

This will be described in greater detail with reference to FIG. 27. For example, the decoding apparatus according to the embodiment may determine whether the following modified conditions for performing reference sample filtering are satisfied (S1310). When any one condition is not satisfied, the decoding apparatus according to the embodiment may set the filterFlag value to 0 (S1320). When all of the following conditions are satisfied, the decoding apparatus according to the embodiment may set to the filterFlag

[1 2 1]/4 Filter for Reference Sample Filtering

A smoothing filter applied to the above-described reference sample filtering step will be described in greater detail. In an embodiment, the decoding apparatus may perform reference sample filtering using a [1 2 1]/4 filter. A smoothing filter for reference sample filtering will be described in greater detail with reference to FIG. 28.

The decoding apparatus may perform reference sample filtering using a reference sample and a value of a sample adjacent to the reference sample. FIG. 28 shows a target sample array 301 to which a [1 2 1]/4 filter will be applied and a result sample array 302 to which the [1 2 1]/4 filter is applied. In an embodiment, the target sample array 301 may be updated to the value of the result sample array 302.

As shown in FIG. 28, the decoding apparatus may apply the [1 2 1]/4 filter to the reference sample, by updating the value of the reference sample to the value of (the left sample value of the reference sample*1+the sample value of the reference sample*2+the right sample value of the reference sample*1)/4 when the reference sample is located above the current block.

Meanwhile, when the reference sample is located at the left side of the current block, the decoding apparatus may apply the [1 2 1]/4 filter to reference sample in the similar manner. For example, the decoding apparatus may update the value of the reference sample to the value of (the upper sample value of the reference sample*1+the sample value of the reference sample*2+the lower sample value of the reference sample*1)/4.

As shown in FIG. 28, the sample array 301 before applying the [1 2 1]/4 filter and the sample array 302 after applying the [1 2 1]/4 filter have a difference in change of the sample value according to the increase of the array index. The sample array 302 to which the [1 2 1]/4 filter is applied has a tendency to smoothly change the sample value than the sample array to which the [1 2 1]/4 filter is not applied.

Second Embodiment

Hereinafter, reference sample filtering according to another embodiment and an intra prediction method accordingly will be described. The decoding apparatus according to the embodiment may perform filtering by applying a smoothing filter to a reference sample only when a prediction mode is a directional intra prediction mode having a slope of an integer multiple. In this case, in a directional intra prediction mode of a non-integer multiple, the reference sample is not filtered. In this case, the decoding apparatus may generate a prediction sample by selectively applying any one of a sharpening filter and a smoothing filter to the reference sample. By performing in this way, the decoding apparatus may increase prediction performance while reducing filtering complexity in a directional intra prediction process.

Figure 29:
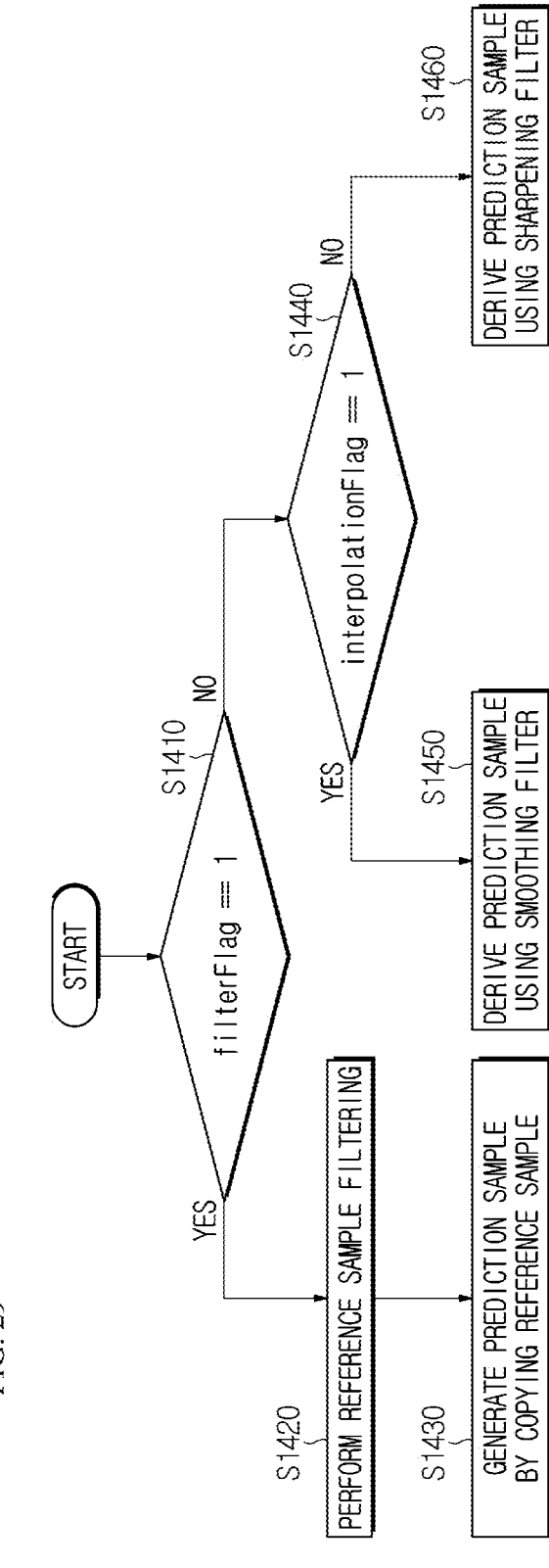
FIG. 29 is a view illustrating another example of performing intra prediction using reference sample filtering by a decoding apparatus according to an embodiment.

Hereinafter, it will be described with reference to FIG. 29. First, an embodiment of filtering a reference sample will be described. The decoding apparatus may filter the reference sample when the following conditions are satisfied. For example, the decoding apparatus according to the embodiment may set the filterFlag value to 1 when all of the following conditions are satisfied. The decoding apparatus according to the embodiment may set the filterFlag value to 0 when neither condition is satisfied. Meanwhile, in order to increase the case where reference sample filtering occurs, the decoding apparatus according to the embodiment may set the filterFlag value to 1 when any one of the following conditions is satisfied. In this case, the decoding apparatus may set the filterFlag value to 0 when all of the following condition are not satisfied.

(Condition 1) A current coding unit is a luma component.
(Condition 2) The value of an MRL index is 0.
(Condition 3) In ISP, split of the coding unit does not occur.
(Condition 4) It is not an MIP mode.
(Condition 5) H*W>32.
(Condition 6) The prediction mode is a planar mode or an integer slope mode. (That is, abs(predIntraAngle) is equal to 32 or multiples thereof).

According to the above conditions, the decoding apparatus may determine whether the value of filterFlag is 1 (S1410), and filter the reference sample only when the prediction mode is a directional intra prediction mode having a slope of an integer multiple (S1420). In addition, the decoding apparatus may generate a prediction sample by copying the filtered reference sample (S1430).

Meanwhile, when the value of filterFlag is not 1, the decoding apparatus may not filter the reference sample in the case of a directional intra prediction mode having a slope of a non-integer multiple. For the directional intra prediction modes having the slope of the non-integer multiple, filtering of reference samples is not performed and instead an interpolation filter may be applied in a process of generating a prediction sample. To this end, the cubic filter having a sharpening characteristic or a Gaussian filter having a smoothing filter described above is applicable. Selection of the filter for interpolating the unfiltered reference sample may be determined according to the size of the current block and the intra prediction mode.

To this end, the decoding apparatus may set the value of a parameter interpolationFlag for selecting a filter for interpolating the reference sample to 1, when the following conditions are satisfied.

(Condition 1) A current coding unit is a luma component.
(Condition 2) The value of an MRL index is 0.
(Condition 3) In ISP, split of the unit coding does not occur.
(Condition 4) It is not an MIP mode.
(Condition 5) H*W>32.
(Condition 6) predModeIntra has a value of 0 or a value greater than 1, and minDistVerHor is greater than intraHorVerDistThres [nTbS]. Here, a parameter minDistVerHor has values of Min(Abs(predModeIntra−50) and Abs (predModeIntra−18)). A parameter intraHorVerDistThres[nTbS] may be determined according to the following table representing correspondence between the intraHorVerDistThres[nTbS] value and a transform block size nTbS.

TABLE 3

|  | nTbS = 2 | nTbS = 3 | nTbS = 4 | nTbS = 5 | nTbS = 6 | nTbS = 7 |
|---|---|---|---|---|---|---|
| intraHorVerDistThres[nTbS] | 16 | 14 | 2 | 0 | 0 | 0 |

The decoding apparatus may select a filter according to the determined value of interpolationFlag (S1440). When the value of interpolationFlag is 1, the decoding apparatus may generate a prediction sample using a smoothing filter such as a Gaussian filter as described above with reference to FIG. 25 (S1450). When the value of interpolationFlag is 0, the decoding apparatus may generate a prediction sample using a sharpening filter such as a cubic filter as described above with reference to FIG. 26 (S1460).

Third Embodiment

Hereinafter, reference sample filtering according to another embodiment and an intra prediction method accordingly will be described. Unlike the second embodiment, by applying reference sample filtering even in the case of a directional intra prediction mode having a slope of a non-integer, it is possible to increase intra prediction efficiency. To this end, the reference sample filtering condition may be changed such that the reference sample is filtered even in the case of a directional intra prediction mode having a slope of a non-integer. Furthermore, when a smoothing filter is used for reference sample filtering, a reference sample is interpolated using a smoothing filter to generate a prediction sample, and, when reference sample filtering is not performed, a reference sample is interpolated using a sharpening filter to generate a prediction sample. Therefore, it is possible to increase intra prediction efficiency.

Figure 30:
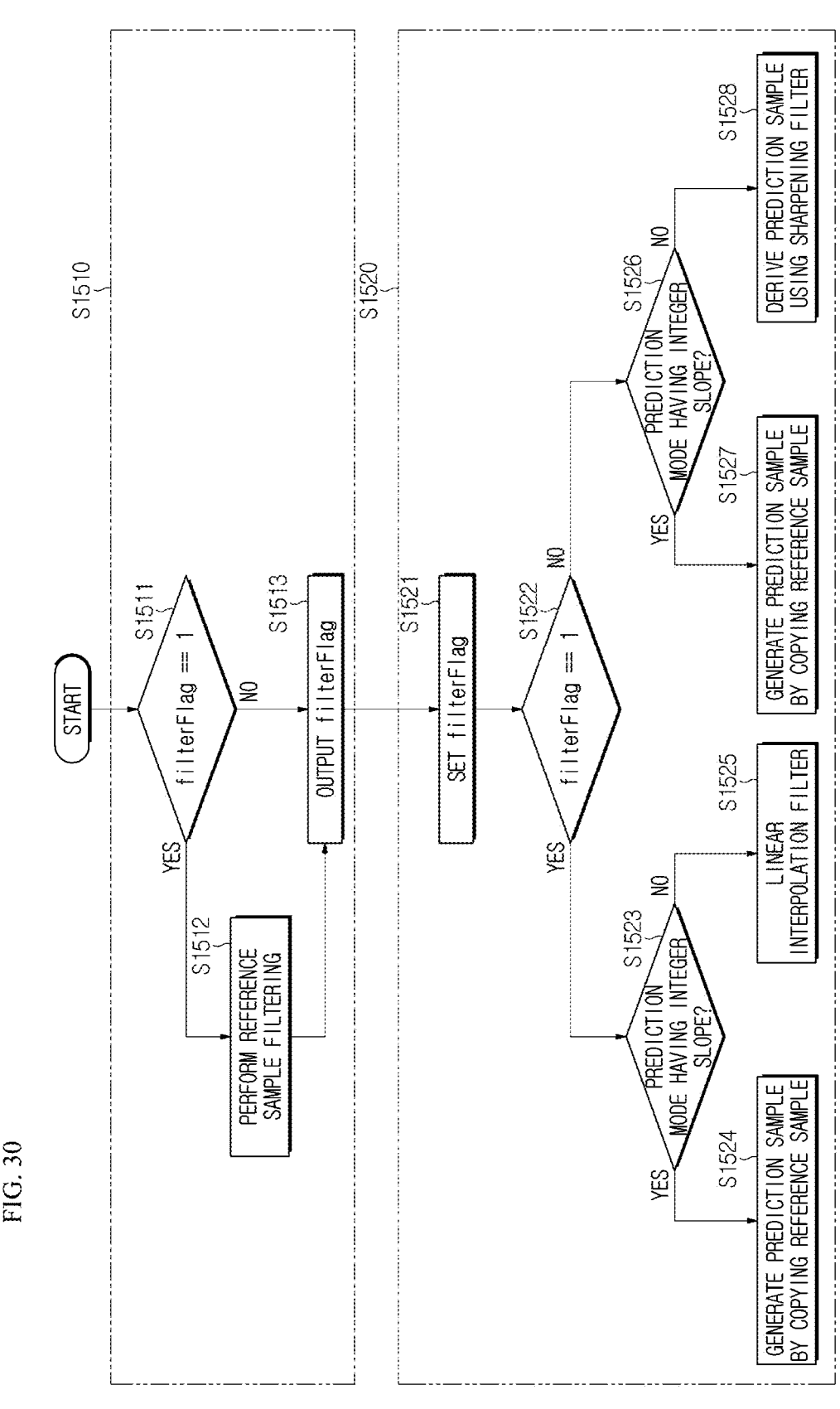
FIGS. 30 to 31 are views illustrating another embodiment of performing intra prediction using reference sample filtering by a decoding apparatus according to an embodiment.

Hereinafter, it will be described with reference to FIG. 30. First, another condition in which a reference sample is filtered will be described. In an embodiment, when a current coding unit is a luma component, the value of an MRL index is 0, split of a coding unit does not occur in ISP, it is not an MIP mode, H*W>32, a prediction mode is a planar mode or has a preset slope according to the size of the CU, the decoding apparatus may set the filterFlag value to 1 and may perform reference sample filtering. Therefore, the decoding apparatus may perform reference sample filtering regardless of whether the slope of the directional prediction mode is an integer multiple.

For the above process, the decoding apparatus according to the embodiment may determine the following modified conditions to determine the filterFlag value in the reference sample filtering step S1510. For example, the decoding apparatus according to the embodiment may set the filterFlag value to 1 when all of the following conditions are satisfied. The decoding apparatus according to the embodiment set the filterFlag value to 0 when neither condition is satisfied. Meanwhile, in order to increase the case where reference sample filtering occurs, the decoding apparatus according to the embodiment may set the filterFlag value to 1 when any one of the following conditions is satisfied. In this case, the decoding apparatus may set the filterFlag value to 0 when all of the following condition are not satisfied.

(Condition 1) The value of refIdx is equal to 0.

(Condition 2) nTbW*nTbH is greater than 32.

(Condition 3) cIdx is equal to 0.

(Condition 4) IntraSubPartitionsSplitType is equal to ISP_NO_SPLIT.

(Condition 5) predModeIntra has a value of 0 or a value greater than 1, and minDistVerHor is greater than intraHorVerDistThres [nTbS]. Here, a parameter minDistVerHor has a value of Min(Abs(predModeIntra−50) and Abs(predModeIntra−18)). A parameter intraHorVerDistThres[nTbS] may be determined according to the following table representing correspondence between the intraHorVerDistThres[nTbS] value and a transform block size nTbS.

TABLE 4

|  | nTbS = 2 | nTbS = 3 | nTbS = 4 | nTbS = 5 | nTbS = 6 | nTbS = 7 |
|---|---|---|---|---|---|---|
| intraHorVerDistThres[nTbS] | 16 | 14 | 2 | 0 | 0 | 0 |

The decoding apparatus may determine whether to perform reference sample filtering according to the value of filterFlag (S1511). When the value of filterFlag is 1, the reference sample may be filtered using a [1 2 1]/4 filter (S1512). Meanwhile, the decoding apparatus may omit reference sample filtering when the value of filterFlag is not 1. In addition, the decoding apparatus may output the value of filterFlag to a prediction sample generation step S1520 (S1513).

Next, in order to perform the prediction sample generation step S1520, the decoding apparatus may receive the filterFlag value generated in the reference sample filtering step S1510 and set the filterFlag value in the prediction sample generation step S1520 (S1521). The decoding apparatus may determine whether the filterFlag value is equal to 1 (S1522). When the prediction sample is generated using the reference sample subjected to reference sample filtering, the filterFlag value may be equal to 1. When the value of filterFlag is 1, the decoding apparatus determines whether the slope of the intra prediction mode of the current block is an integer slope (S1523). The decoding apparatus may obtain the value of predModeIntra indicating the intra prediction mode of the current block and intraPredAngle which is a value indicating the slope of the current using the table of FIG. 16, as described above. When the obtained intraPredAngle value is a multiple of 32, the decoding apparatus may determine that the slope of the intra prediction mode of the current block is a integer multiple. When the slope of the intra prediction mode of the current block is an integer slope, the decoding apparatus may generate a prediction sample by simply copying the value of the reference sample to the prediction sample (S1524). When the slope of the intra prediction mode of the current block is not an integer slope (non-integer slope), for example, when the obtained intraPredAngle value is not a multiple of 32, the decoding apparatus may generate a prediction sample by applying a linear interpolation sample to the value of the reference sample as in the example of FIG. 32 (S1524).

Meanwhile, when the value of filterFlag is not 1, this indicates that the reference sample is not filtered. In this case, when the value is not 1, the decoding apparatus may determine whether to apply an interpolation filter depending on whether the intra prediction mode has an integer slope (S1526). The decoding apparatus may apply a sharpening filter such as a 4-tap cubic filter to the reference sample to generate a prediction sample (S1528), when the intra prediction mode of the current block is a directional prediction mode having a non-integer slope, and copy the reference sample without applying filtering of the prediction sample to generate a prediction sample (S1527), when the intra prediction mode of the current block is a directional prediction mode having an integer slope.

Fourth Embodiment

Hereinafter, reference sample filtering according to another embodiment and an intra prediction method accordingly will be described. In the third embodiment, a method of generating a prediction sample by determining whether to perform reference sample filtering and the slope of the intra prediction mode of the current block was determined. Meanwhile, the decoding apparatus according to the embodiment may apply filtering of the prediction sample based on whether the current block is a luma block, whether to perform reference sample filtering and the intra prediction mode of the current block. Therefore, the decoding apparatus may generate an intra prediction sample more simply than in the third embodiment.

Figure 31:
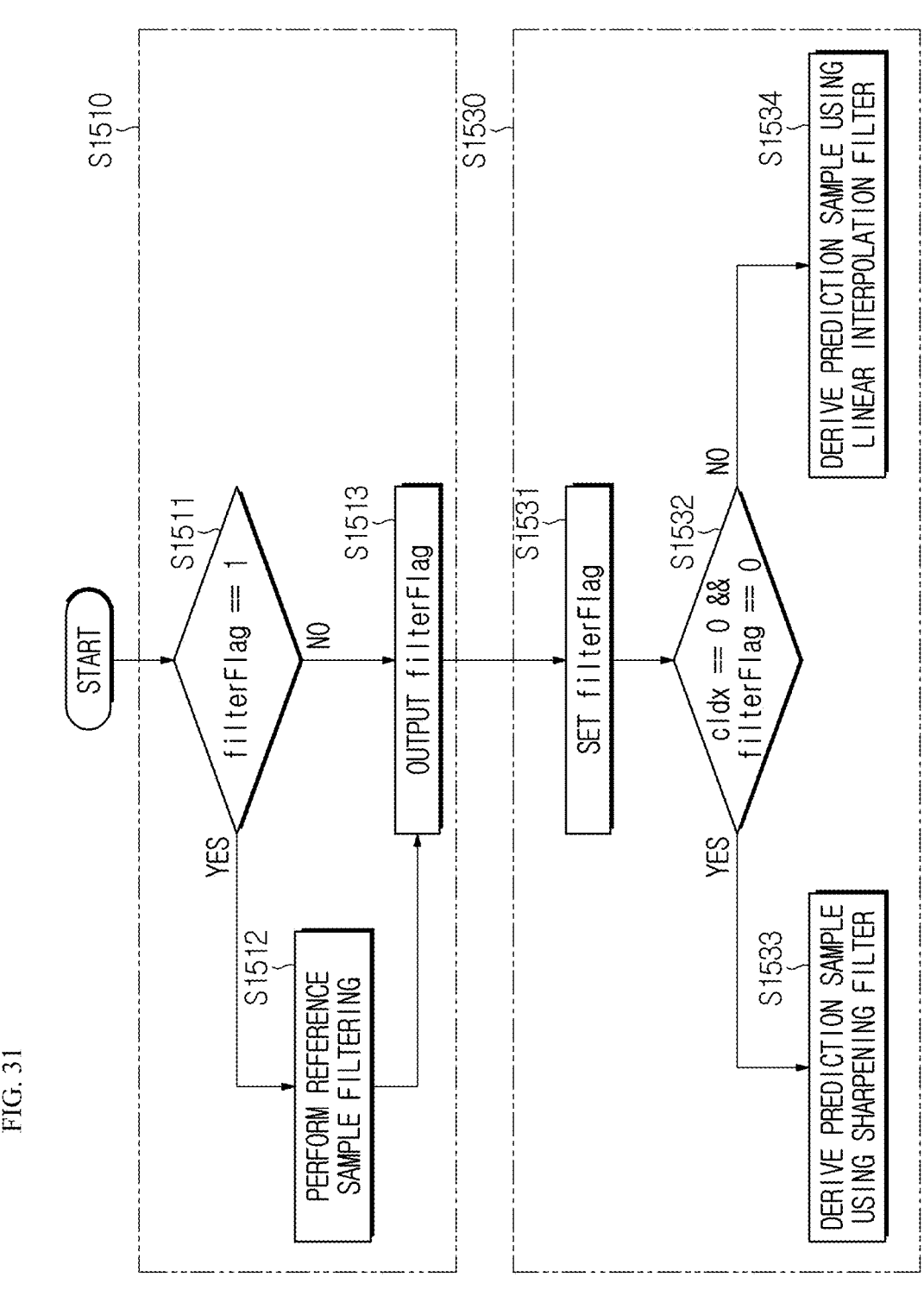

Hereinafter, it will be described with reference to FIG. 31. Step S1510 of filtering the reference sample may be performed in the same manner as in the embodiment described with reference to FIG. 30. The decoding apparatus may receive the filterFlag value in the reference sample filtering step S1510 and set it as the filterFlag value in the intra prediction sample generation step S1530 (S1531).

When the intra prediction mode is equal to or greater than a 34th directional prediction mode (INTRA_ANGULAR34), the decoding apparatus according to the embodiment may derive a reference sample array ref[x] as described above and derive iIdx and iFact values according to the following equation.

$$iIdx = (((y + 1 + refIdx) * intraPredAngle) >> 5) + refIdx \quad \text{[Equation 42]}$$

$$iFact = ((y + 1 + refIdx) * intraPredAngle) \, \& \, 31 \quad \text{[Equation 43]}$$

Next, the decoding apparatus may determine a filter applied to the reference sample to derive the prediction sample depending on whether cIdx is 0 and filterFlag is 0 (S1532). The decoding apparatus may generate the prediction sample by applying a sharpening filter as follows when cIdx is 0 and filterFlag is 0 (S1533). For example, the decoding apparatus may use a cubic filter which is one of the sharpening filters. The decoding apparatus may derive an interpolation filter coefficient fT[j] as shown in the following equation. Here, j=0 to 3.

$$fT[j] = fC[iFact][j] \quad \text{[Equation 44]}$$

In addition, the decoding apparatus may derive the value of the prediction sample predSamples[x][y] as shown in the following equation.

$$predSamples[x][y] = \quad \text{[Equation 45]}$$
$$Clip1\left(\left(\left(\sum_{i=0}^{3} fT[i] * ref[x + iIdx + i]\right) + 32\right) >> 6\right)$$

Meanwhile, when an intra prediction mode is equal to or greater than a $34^{th}$ directional prediction mode (INTRA_ANGULAR34), but cIdx is not 0 or filterFlag is 1, the decoding apparatus may generate a prediction sample by applying a linear interpolation filter as follows (S1534).

When the value of iFact is not 0, the decoding apparatus may derive the value of the prediction sample predSamples[x][y] according to the following equation.

$$predSamples[x][y] = ((32 - iFact) * ref[x + iIdx + 1] + \quad \text{[Equation 46]}$$
$$iFact * ref[x + iIdx + 2] + 16) >> 5$$

Figure 32:
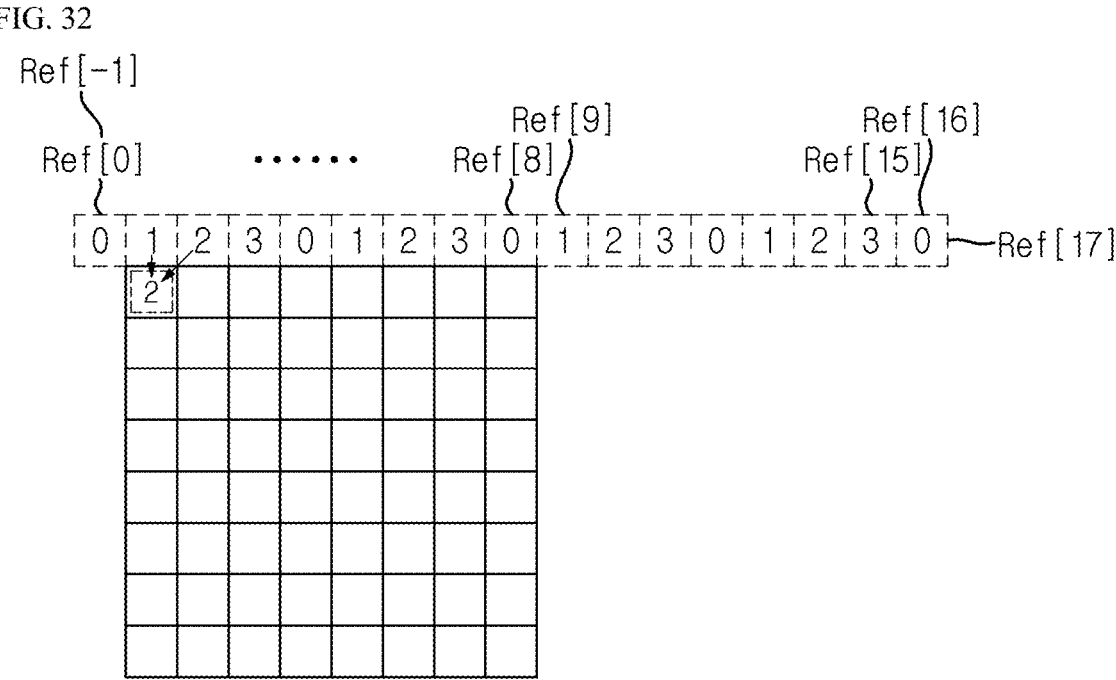
FIG. 32 is a view illustrating an example of generating an intra prediction sample using a linear interpolation filter by a decoding apparatus according to an embodiment.

By the above equation, for a current block in which refIdx is 0, nTbw is 8, nTbH is 8, cIdx is 0, and the value of predModeIntra is 65, the value of iFact is calculated as 29 and the value of iIdx is calculated as 0. In this case, an example of the prediction sample value of predSamples[0], [0] calculated according to the above equation is shown in FIG. 32.

Meanwhile, when the value of iFact is 0, the decoding apparatus may derive the value of the prediction sample predSamples[x][y] as follows.

$$preSamples[x][y] = ref[x + iIdx + 1] \quad \text{[Equation 47]}$$

Meanwhile, when an intra prediction mode is less than a $34^{th}$ directional prediction mode (INTRA_ANGULAR34), the decoding apparatus according to the embodiment may derive a reference sample array ref[x] as described above, and may derive iIdx and iFact values according to the following equations.

$$iIdx = (((x + 1 + refIdx) * intraPredAngle) >> 5) + refIdx \quad \text{[Equation 48]}$$

$$iFact = ((x + 1 + refIdx) * intraPredAngle) \, \& \, 31 \quad \text{[Equation 48]}$$

Next, when cIdx is 0 and refFilterFlag is 0, the decoding apparatus may generate a prediction sample by applying a cubic filter as follows. First, an interpolation filter coefficient fT[j] may be derived as shown in the following equation. Here, j=0 to 3.

$$fT[j] = fC[iFact][j] \quad \text{[Equation 50]}$$

Next, the decoding apparatus may derive the value of the prediction sample predSamples[x][y] as shown in the following equation.

$$predSamples[x][y] = \quad \text{[Equation 51]}$$
$$Clip1\left(\left(\left(\sum_{i=0}^{3} fT[i] * ref[y + iIdx + i]\right) + 32\right) >> 6\right)$$

Meanwhile, when an intra prediction mode is less than a $34^{th}$ directional prediction mode (INTRA_ANGULAR34) but cIdx is not 0 or refFilterFlag is 1, the decoding apparatus according to the embodiment may generate a prediction sample by applying a linear interpoation filter as follows.

When the value of iFact is not 0, the decoding apparatus may derive the value of the prediction sample predSamples [x][y] according to the following equation.

$$predSamples[x][y] = ((32 - iFact) * ref[y + iIdx + 1] + \quad \text{[Equation 52]}$$
$$iFact * ref[y + iIdx + 2] + 16) >> 5$$

Meanwhile, when the value of iFact is 0, the decoding apparatus may derive the value of the prediction sample predSamples[x][y] as follows.

$$predSamples[x][y] = ref[y + iIdx + 1] \quad \text{[Equation 53]}$$

Fifth Embodiment

In an embodiment, the decoding apparatus may determine whether at least one condition for performing reference sample filtering is satisfied. The decoding apparatus may store the determined result in refFilterFlag which is a parameter indicating performability of reference sample filtering. Thereafter, the decoding apparatus may signal the parameter refFilterFlag to a reference sample filtering step and a prediction sample generation step. Therefore, the decoding apparatus may simply use the value of refFilterFlag, without re-calculating conditions determined to determine the value of refFilterFlag in the reference sample filtering step and the prediction sample generation step. Therefore, it is possible to improve the intra prediction speed of the decoding apparatus.

Figure 33:
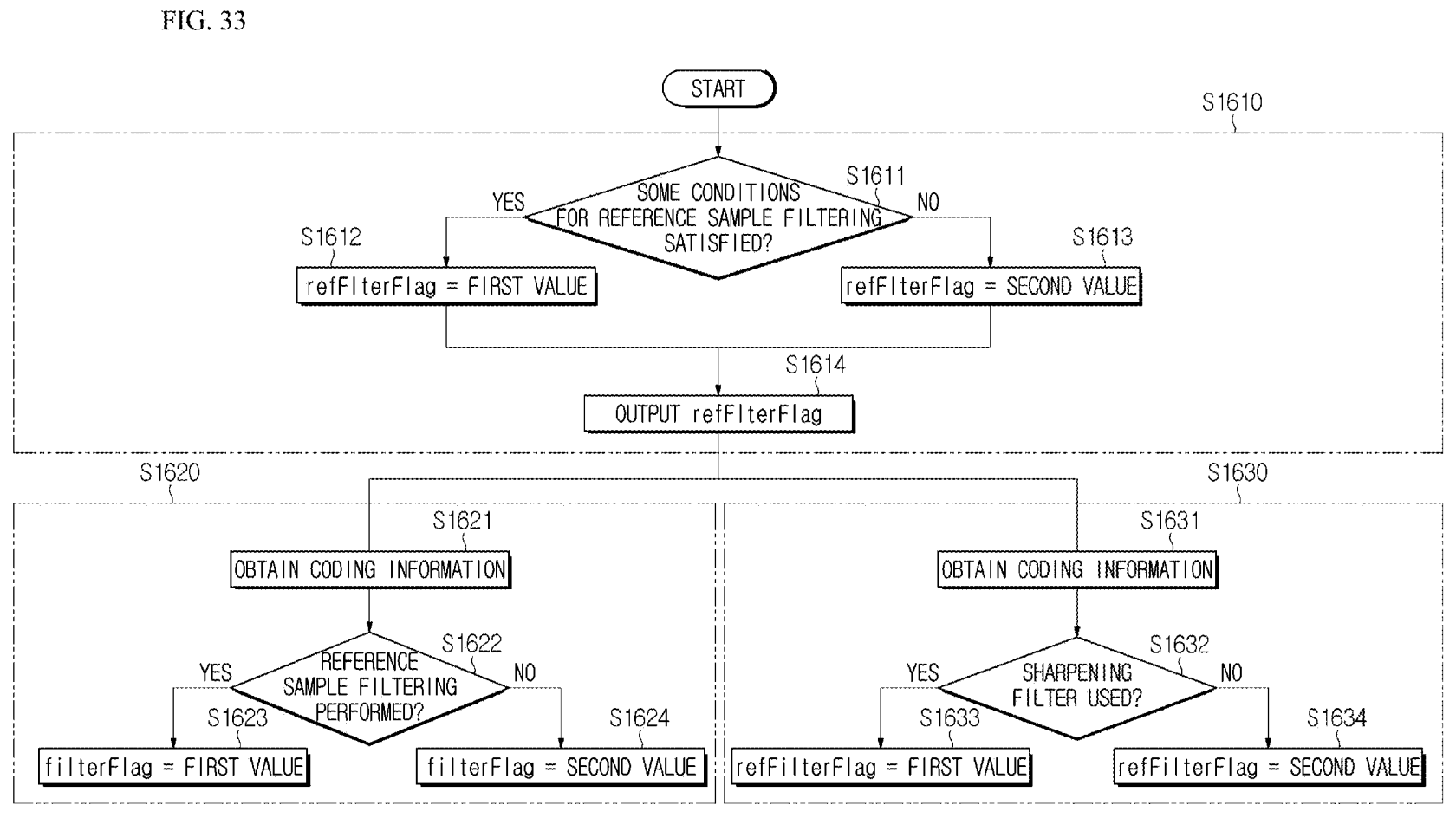

Hereinafter, it will be described with reference to FIG. 33. FIG. 33 is a view illustrating another embodiment of performing intra prediction using reference sample filtering. First, the decoding apparatus according to the embodiment may perform step S1610 of determining whether some conditions for reference sample filtering are satisfied before the reference sample filtering step S1620 and the prediction sample generation step S1630. The decoding apparatus according to the embodiment may determine whether some conditions for reference sample filtering are satisfied based on the value of predModeIntra (S1611).

For example, when predModeIntra indicates a planar mode or a directional mode indicating a reference sample at an integer position, the decoding apparatus may determine that some conditions are satisfied. In this case, the decoding apparatus may determine the value of refFilterFlag as a first value (S1612). In this case, although a vertical mode and a horizontal mode are modes indicating a reference sample at an integer position, the decoding apparatus may determine that a first condition is not satisfied. For example, when the value of predModeIntra is any one of 0, −14, −12, −10, −6, 2, 34, 66, 72, 76, 78 and 80, since the first condition is satisfied, the decoding apparatus may determine the value of refFilterFlag as a first value. For example, the first value may be 1. In addition, when the value of predModeIntra is not the above value, the decoding apparatus may determine that the first condition is not satisfied and determine the value of refFilterFlag as a second value (S1613). For example, the second value may be 0. Next, the decoding apparatus may output the determined refFilterFlag value (S1614). The decoding apparatus may output the refFilterFlag value to the reference sample filtering step S1620 and the prediction sample generation step 1630.

Next, the decoding apparatus according to the embodiment may perform the reference sample filtering step S1620. The decoding apparatus may determine whether to perform reference sample filtering depending on whether the conditions for performing reference sample filtering are satisfied. In an embodiment, the decoding apparatus may determine whether to perform reference sample filtering according to the value of refFilterFlag, and generate reference sample p[x][y] by performing reference sample filtering. Here, x=−1−refIdx, y=−1−refIdx to refH−1 and x=−refIdx to refW−1, y=−1−refIdx. The decoding apparatus according to the embodiment may receive the following coding information including refFilterFlag generated in step S1610 for reference sample filtering (S1621).

refIdx which is a parameter indicating an intra prediction reference line index nTbW which is a parameter indicating a width of a transform block nTbH which is a parameter indicating a height of a transform block refW which is a parameter indicating a width of a reference sample refH which is a parameter indicating a height of a reference sample refFilterFlag which is a parameter indicating whether to apply reference sample filtering unfiltered neighboring sample refUnfilt[x][y], where, x=−1−refIdx, y=−1−refIdx to refH−1 and x=−refIdx to refW−1, y=−1−refIdx.

cIdx which is a parameter indicating a color component of a current block

The decoding apparatus according to the embodiment may determine whether to perform reference sample filtering using the obtained coding information (S1622). When all of the following conditions are true, the decoding apparatus according to the embodiment may set the parameter filterFlag indicating to whether to perform reference sample filtering to a first value (S1623). For example, the first value may be 1. In addition, when all of the following conditions are true, the decoding apparatus may perform reference sample filtering. Meanwhile, when any one of the following conditions is not true, the decoding apparatus may set the parameter filterFlag to a second value and may not perform reference sample filtering (S1624). For example, the second value may be 0.

(Condition 1) refIdx is equal to 0.

(Condition 2) nTbW*nTbH is greater than 32.

(Condition 3) cIdx is equal to 0.

(Condition 4) IntraSubPartitionsSplitType is equal to ISP_NO_SPLIT.

(Condition 5) refFilterFlag is equal to 1.

When the value of filterFlag generated in the reference sample filtering step is equal to 1, the decoding apparatus according to the embodiment may derive the filtered sample value p[x][y] as follows. Here, x=−1, y=−1 to refH−1 and x=0 to refW−1, y=−1.

$$p[-1][-1] = (refUnfilt[-1][0] + \qquad \text{[Equation 54]}$$
$$2 * refUnfilt[-1][-1] + refUnfilt[0][-1] + 2 \gg 2$$

$$p[-1][y] = (refUnfilt[-1][y+1] + 2 * refUnfilt[-1][y] + \qquad \text{[Equation 55]}$$
$$refUnfilt[-1][y-1] + 2) \gg 2 \text{ where, } y = 0 \text{ to } refH - 2.$$

$$p[-1][refH-1] = refUnfilt[-1][refH-1] \qquad \text{[Equation 56]}$$

$$p[x][-1] = (refUnfilt[x-1][-1] + 2 * refUnfilt[x][-1] + \qquad \text{[Equation 57]}$$
$$refUnfilt[x+1][-1] + 2) \gg 2, \text{ where, } x = 0 \text{ to } refW - 2.$$

$$p[refW-1][-1] = refUnfilt[refW-1][-1] \qquad \text{[Equation 58]}$$

When the value of filterFlag generated in the reference sample filtering step is not 1, the decoding apparatus according to the embodiment may set the reference sample value p[x][y] to be equal to the unfiltered sample value refUnfilt [x][y]. Here, x=−1−refIdx, y=−1−refIdx to refH−1 and x=−refIdx to refW−1, y=−1−refIdx.

Next, the decoding apparatus according to the embodiment may perform a prediction sample generation step S1630. The decoding apparatus may determine the filter of the intra prediction mode according to the value of refFilterFlag in the prediction sample generation step S1630. For example, the decoding apparatus according to the embodiment may determine the filter of the intra prediction mode according to the value of refFilterFlag for the directional intra prediction mode of INTRA_ANGULAR2 to INTRA_ANGULAR66, and generate a prediction sample predSamples[x][y] by applying a filter to the reference sample. Here, x=0 to nTbW−1, and y=0 to nTbH−1.

For the above step, the decoding apparatus according to the embodiment may obtain the following coding information including refFilterFlag generated in step S1610 (S1631).

predModeIntra which is a parameter indicating an intra prediction mode refIdx which is a parameter indicating an intra prediction reference line index nTbW which is a parameter indicating a width of a transform block nTbH which is a parameter indicating a height of a transform block refW which is a parameter indicating a width of a reference sample refH which is a height of a reference sample nCbW which is a parameter indicating a width of a coding block nCbH which is a parameter indicating a height of a coding block refFilterFlag which is a parameter indicating a value of a reference filter flag cIdx which is a parameter indicating a color component of a current block neighboring sample p[x][y], where, x=−1−refIdx, y=−1− refIdx to refH−1 and x=−refIdx to refW−1, y=−1− refIdx.

In addition, the decoding apparatus according to the embodiment may generate a variable nTbS having a value of (Log 2 (nTbW)+Log 2 (nTbH))>>1.

The decoding apparatus according to the embodiment determines whether conditions for using a sharpening filter are satisfied (S1632). For example, when one or more of the following conditions are true, the decoding apparatus may determine that the conditions for using the sharpening filter are satisfied and set the value of filterFlag to a first value (S1633). For example, the first value may be 0.

(Condition 1) The value of refFilterFlag is 1.

(Condition 2) The value of refIdx is not 0.

(Condition 3) IntraSubPartitionsSplitType is not equal to ISP_NO_SPLIT.

Meanwhile, when all of the above conditions are not satisfied, the decoding apparatus may set filterFlag to a second value (S1634). Here, the second value may be 1. That is, the decoding apparatus may set the value of filterFlag to 1 when the value of refFilterFlag is 0, and set the value of filterFlag to 0 when the value of refFilterFlag is 1.

Meanwhile, in an embodiment, the decoding apparatus may perform steps S1632 to S1634 by storing the calculation result of 1−refFilterFlag as the filterFlag value.

Meanwhile, the decoding apparatus may determine the filterFlag value by further considering additional conditions, when all of Conditions 1 to 3 are not satisfied. For example, the decoding apparatus may set filterFlag to a second value, when minDistVerHor is greater than intraHorVerDistThres [nTbS]. Here, the second value may be 1. Meanwhile, the decoding apparatus may set filterFlag to a first value, when minDistVerHor is less than or equal to intraHorVerDistThres [nTbS]. Here, the first value may be 0. For this calculation, the decoding apparatus may set the parameter minDistVerHor to Min(Abs(predModeIntra−50) and Abs (predModeIntra−18)), and set the parameter intraHorVerDistThres[nTbS] according to a transform block size nTbS as shown in the following table.

TABLE 5

| | nTbS = 2 | nTbS = 3 | nTbS = 4 | nTbS = 5 | nTbS = 6 | nTbS = 7 |
|---|---|---|---|---|---|---|
| intraHorVerDistThres[nTbS] | 24 | 14 | 2 | 0 | 0 | 0 | steps, may include remaining steps except for some of the steps, or may include other additional steps except for some steps.

In the present disclosure, the image encoding apparatus or the image decoding apparatus that performs a predetermined operation (step) may perform an operation (step) of confirming an execution condition or situation of the corresponding operation (step). For example, if it is described that predetermined operation is performed when a predetermined condition is satisfied, the image encoding apparatus or the image decoding apparatus may perform the predetermined operation after determining whether the predetermined condition is satisfied.

The various embodiments of the present disclosure are not a list of all possible combinations and are intended to describe representative aspects of the present disclosure, and the matters described in the various embodiments may be applied independently or in combination of two or more.

Various embodiments of the present disclosure may be implemented in hardware, firmware, software, or a combination thereof. In the case of implementing the present disclosure by hardware, the present disclosure can be implemented with application specific integrated circuits (ASICs), Digital signal processors (DSPs), digital signal processing devices (DSPDs), programmable logic devices (PLDs), field programmable gate arrays (FPGAs), general processors, controllers, microcontrollers, microprocessors, etc.

In addition, the image decoding apparatus and the image encoding apparatus, to which the embodiments of the present disclosure are applied, may be included in a multimedia broadcasting transmission and reception device, a mobile communication terminal, a home cinema video device, a digital cinema video device, a surveillance camera, a video chat device, a real time communication device such as video communication, a mobile streaming device, a storage medium, a camcorder, a video on demand (VoD) service providing device, an OTT video (over the top video) device, an Internet streaming service providing device, a three-dimensional (3D) video device, a video telephony video device, a medical video device, and the like, and may be used to process video signals or data signals. For example, the OTT video devices may include a game console, a blu-ray player, an Internet access TV, a home theater system, a smartphone, a tablet PC, a digital video recorder (DVR), or the like.

Figure 34:
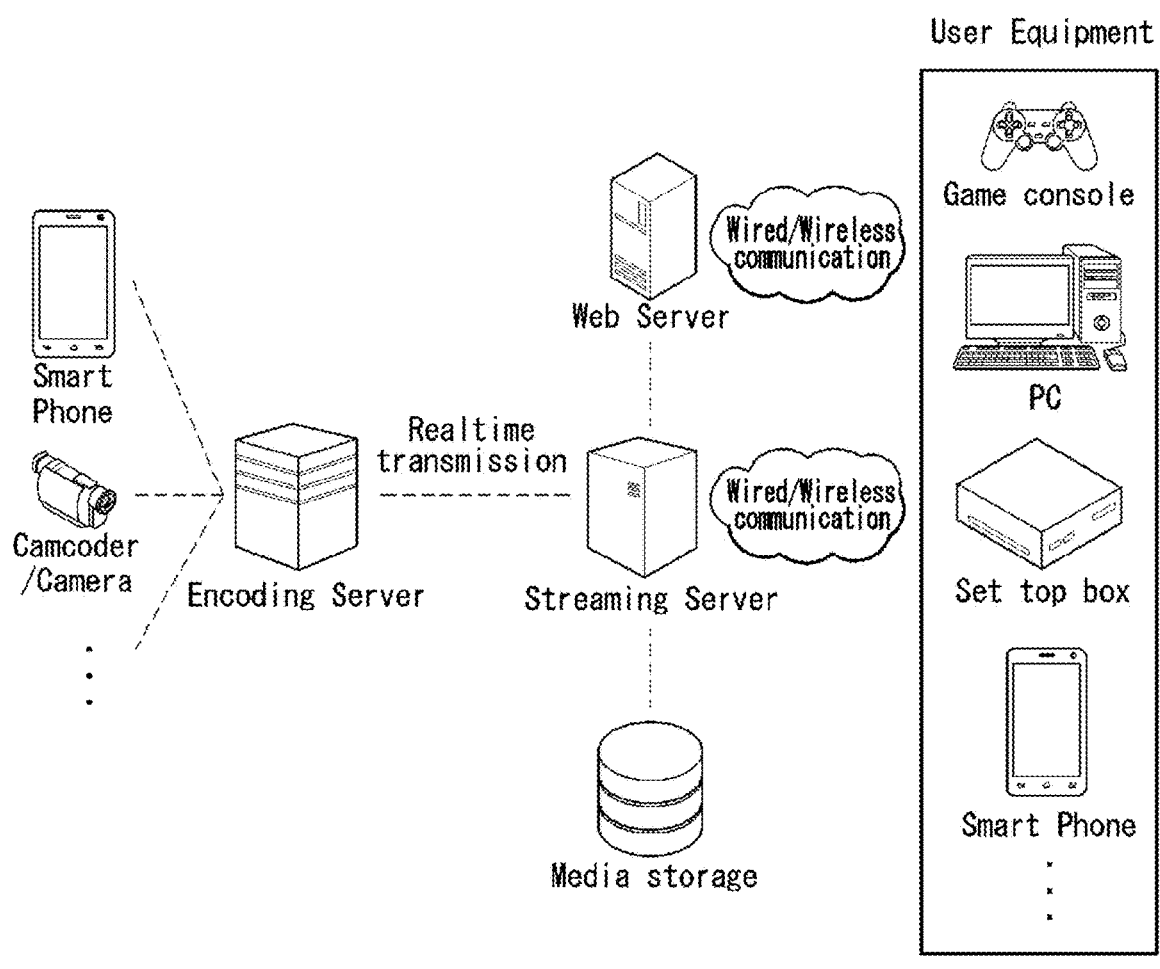
FIG. 34 is a view illustrating a content streaming system according to an embodiment

FIG. 34 is a view showing a contents streaming system, to which an embodiment of the present disclosure is applicable.

As shown in FIG. 34, the contents streaming system, to which the embodiment of the present disclosure is applied, may largely include an encoding server, a streaming server, a web server, a media storage, a user device, and a multimedia input device.

While the exemplary methods of the present disclosure described above are represented as a series of operations for clarity of description, it is not intended to limit the order in which the steps are performed, and the steps may be performed simultaneously or in different order as necessary. In order to implement the method according to the present disclosure, the described steps may further include other The encoding server compresses contents input from multimedia input devices such as a smartphone, a camera, a camcorder, etc. into digital data to generate a bitstream and transmits the bitstream to the streaming server. As another example, when the multimedia input devices such as smartphones, cameras, camcorders, etc. directly generate a bitstream, the encoding server may be omitted.

The bitstream may be generated by an image encoding method or an image encoding apparatus, to which the embodiment of the present disclosure is applied, and the streaming server may temporarily store the bitstream in the process of transmitting or receiving the bitstream.

The streaming server transmits the multimedia data to the user device based on a user's request through the web server, and the web server serves as a medium for informing the user of a service. When the user requests a desired service from the web server, the web server may deliver it to a streaming server, and the streaming server may transmit multimedia data to the user. In this case, the contents streaming system may include a separate control server. In this case, the control server serves to control a command/response between devices in the contents streaming system.

The streaming server may receive contents from a media storage and/or an encoding server. For example, when the contents are received from the encoding server, the contents may be received in real time. In this case, in order to provide a smooth streaming service, the streaming server may store the bitstream for a predetermined time.

Examples of the user device may include a mobile phone, a smartphone, a laptop computer, a digital broadcasting terminal, a personal digital assistant (PDA), a portable multimedia player (PMP), navigation, a slate PC, tablet PCs, ultrabooks, wearable devices (e.g., smartwatches, smart glasses, head mounted displays), digital TVs, desktops computer, digital signage, and the like.

Each server in the contents streaming system may be operated as a distributed server, in which case data received from each server may be distributed.

The operation according to the method of the various embodiments described above can run on device or computer by software or instructions executable on the device (e.g., operating system, application, firmware, program, etc.) executed on the device or computer. and such software or instructions executable in the device may be recorded in a non-transitory computer-readable medium that is executable through the device or a component of a computer. The computer-readable recording medium may include program instructions, data files, data structures, etc. alone or in combination. The program instructions recorded in the computer-readable recording medium may be specially designed and configured to implement the present disclosure, or may be known and used by those skilled in the computer software field. Examples of the computer-readable recording medium include magnetic recording media such as hard disks, floppy disks, and magnetic tapes; optical data storage media such as CD-ROMs or DVD-ROMs; magneto-optimum media such as floptical disks; and hardware devices, such as read-only memory (ROM), random-access memory (RAM), flash memory, etc., which are particularly structured to store and implement the program instruction. Examples of the program instructions include not only a mechanical language code formatted by a compiler but also a high level language code that may be implemented by a computer using an interpreter. The hardware devices may be configured to be operated by one or more software modules or vice versa to conduct the processes according to the present invention.

In the above, the specific technical idea for encoding and decoding a video or image has been described with reference to the limited embodiments and drawings, but this is only provided to help the overall understanding, and the technical idea described in the present disclosure is not limited to the embodiments. Those of ordinary skill in the art to which the technical idea described in the present disclosure pertains may devise various modifications and variations from these descriptions.

Therefore, the technical idea described in the present disclosure should not be limited to the above-described embodiment, and claims to be described later below as well as all modifications equivalently or equivalent to these claims fall within the scope of the present disclosure.

INDUSTRIAL APPLICABILITY

The embodiments of the present disclosure may be used to encode or decode video.

The invention claimed is:

1. An image decoding method performed by an image decoding apparatus, the image decoding method comprising:

obtaining intra prediction mode information of a current block from a bitstream;

determining an intra prediction mode of the current block based on the intra prediction mode information of the current block and an intra prediction mode of a neighboring block located around the current block;

deriving a value of a reference sample filter flag based on coding parameters for the current block;

determining whether to filter a reference sample for intra prediction of the current block based on the reference sample filter flag;

selecting an interpolation filter applied to the reference sample for generating intra prediction samples of the current block based on the reference sample filter flag; and generating the intra prediction samples of the current block using the selected interpolation filter, wherein the intra prediction mode information of the current block comprises an index information for specifying one intra prediction mode among intra prediction mode candidates, wherein the coding parameters comprise at least one of a multi-reference line index of the current block, a size of the current block, a color component of the current block, whether to apply intra sub-partitions (ISP) to the current block or the intra prediction mode of the current block, and wherein the selecting the interpolation filter applied to the reference sample for generating the intra prediction samples of the current block based on the reference sample filter flag comprises:

deriving a value of an interpolation filter flag for the intra prediction samples of the current block based on the reference sample filter flag; and selecting an interpolation filter based on the interpolation filter flag.

2. The image decoding method of claim 1, wherein filtering of the reference sample for intra prediction is not used, based on the value of the reference sample filter flag being a first value, wherein filtering of the reference sample for intra prediction is used, based on the value of the reference sample filter flag being a second value, wherein the interpolation filter for the intra prediction samples of the current block is determined as a filter having a sharpening characteristic, based on the value of the reference sample filter flag being the first value, and wherein the interpolation filter for the intra prediction samples of the current block is determined as a filter having a smoothing characteristic, based on the value of the reference sample filter flag being the second value.

3. The image decoding method of claim 1, wherein the value of the interpolation filter flag is derived as a first value, based on a condition for at least one of the coding parameters is satisfied.

4. The image decoding method of claim 3, wherein the value of the interpolation filter flag is derived as the first value, based on intra sub-partitions (ISP) being applied to the current block.

5. The image decoding method of claim 3, wherein the value of the interpolation filter flag is derived as the first value, based on intra sub-partitions (ISP) being applied to the current block, the current block being a luma block, the intra prediction mode of the current block being equal to or greater than a predetermined mode and a width of the current block being equal to or greater than a predetermined size.

6. The image decoding method of claim 5, wherein the predetermined mode is a top-left diagonal mode and the predetermined size is 8.

7. The image decoding method of claim 3, wherein the value of the interpolation filter flag is derived as the first value, based on intra sub-partitions (ISP) being applied to the current block, the current block being a luma block, the intra prediction mode of the current block being equal to or less than a predetermined mode and a width of the current block being equal to or greater than a predetermined size.

8. The image decoding method of claim 7, wherein the predetermined mode is a top-left diagonal mode and the predetermined size is 8.

9. The image decoding method of claim 1,
wherein filtering of the reference sample for intra prediction is not used, based on the value of the reference sample filter flag being a first value,
wherein filtering of the reference sample for intra prediction is used, based on the value of the reference sample filter flag being a second value, and
wherein the value of the interpolation filter flag is derived as 0 based on the value of the reference sample filter flag being 1.

10. The image decoding method of claim 9,
wherein the interpolation filter is a filter having a sharpening characteristic, based on the value of the interpolation filter flag being a first value,
wherein the interpolation filter is a filter having a smoothing characteristic, based on the value of the interpolation filter flag being a second value, and
wherein the value of the interpolation filter flag is derived as the first value, based on the value of the reference sample filter flag being the second value.

11. An image encoding method performed by an image encoding apparatus, the image encoding method comprising:
selecting an intra prediction mode of a current block;
deriving a value of a reference sample filter flag based on coding parameters for the current block;
determining whether to filter a reference sample for intra prediction of the current block based on the reference sample filter flag;
selecting an interpolation filter applied to the reference sample for generating intra prediction samples of the current block based on the reference sample filter flag;
generating the intra prediction samples of the current block using the selected interpolation filter; and encoding intra prediction mode information of the current block based on an intra prediction mode of a neighboring block located around the current block,
wherein the intra prediction mode information of the current block comprises an index information for specifying one intra prediction mode among intra prediction mode candidates,
wherein the coding parameters comprise at least one of a multi-reference line index of the current block, a size of the current block, a color component of the current block, whether to apply intra sub-partitions (ISP) to the current block or the intra prediction mode of the current block, and
wherein the selecting the interpolation filter applied to the reference sample for generating the intra prediction samples of the current block based on the reference sample filter flag comprises:
deriving a value of an interpolation filter flag for the intra prediction samples of the current block based on the reference sample filter flag; and
selecting an interpolation filter based on the interpolation filter flag.

12. A method of transmitting a bitstream comprising:
transmitting a bitstream generated by an image encoding method,
wherein the image encoding method comprises:
selecting an intra prediction mode of a current block;
deriving a value of a reference sample filter flag based on coding parameters for the current block;
determining whether to filter a reference sample for intra prediction of the current block based on the reference sample filter flag;
selecting an interpolation filter applied to the reference sample for generating intra prediction samples of the current block based on the reference sample filter flag;
generating the intra prediction samples of the current block using the selected interpolation filter; and
encoding intra prediction mode information of the current block based on an intra prediction mode of a neighboring block located around the current block,
wherein the intra prediction mode information of the current block comprises an index information for specifying one intra prediction mode among intra prediction mode candidates,
wherein the coding parameters comprise at least one of a multi-reference line index of the current block, a size of the current block, a color component of the current block, whether to apply intra sub-partitions (ISP) to the current block or the intra prediction mode of the current block, and
wherein the selecting the interpolation filter applied to the reference sample for generating the intra prediction samples of the current block based on the reference sample filter flag comprises:
deriving a value of an interpolation filter flag for the intra prediction samples of the current block based on the reference sample filter flag; and
selecting an interpolation filter based on the interpolation filter flag.

* * * * *